US011970418B2

(12) United States Patent
Fournel et al.

(10) Patent No.: US 11,970,418 B2
(45) Date of Patent: Apr. 30, 2024

(54) METHODS TO CONTROL SHAPE UNIFORMITY IN GLASS TUBE CONVERTING PROCESSES

(71) Applicant: CORNING INCORPORATED, Corning, NY (US)

(72) Inventors: Olivier Fournel, Yerres (FR); Kevin Patrick McNelis, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 114 days.

(21) Appl. No.: 17/398,058

(22) Filed: Aug. 10, 2021

(65) Prior Publication Data

US 2022/0048805 A1 Feb. 17, 2022

Related U.S. Application Data

(60) Provisional application No. 63/064,631, filed on Aug. 12, 2020.

(51) Int. Cl.
| | |
|---|---|
| *C03B 37/012* | (2006.01) |
| *C03B 23/043* | (2006.01) |
| *C03B 23/08* | (2006.01) |
| *C03B 23/09* | (2006.01) |
| C03B 37/027 | (2006.01) |
| C03B 37/03 | (2006.01) |

(52) U.S. Cl.
CPC ............ *C03B 23/08* (2013.01); *C03B 23/043* (2013.01); *C03B 23/094* (2013.01)

(58) Field of Classification Search
None
See application file for complete search history.

(56) References Cited

U.S. PATENT DOCUMENTS

| | | | |
|---|---|---|---|
| 10,773,989 B2 | 9/2020 | Gaylo et al. | |
| 2018/0273418 A1* | 9/2018 | Gaylo | ..................... C03B 35/26 |
| 2019/0161380 A1* | 5/2019 | Gaylo | ................... C03B 23/095 |

(Continued)

FOREIGN PATENT DOCUMENTS

DE 3330759 A1 * 8/1983 ........... C03B 23/043

OTHER PUBLICATIONS

International Search Report and Written Opinion of the International Searching Authority; PCT/US2021/44169; dated Nov. 3, 2020; 12 pages; European Patent Office.

*Primary Examiner* — Galen H Hauth
*Assistant Examiner* — Steven S Lee
(74) *Attorney, Agent, or Firm* — F. Brock Riggs

(57) ABSTRACT

Methods for producing glass articles from glass tube includes securing a glass tube in a holder of a converter; rotating the glass tube; and passing the glass tube through processing stations, which include at least a heating station and a forming station, to form one or more features at a working end of the glass tube. An active time is an amount of time the glass tube is engaged with a heating element or a forming tool while in a processing station, and an exposure index for the processing station is the rotational speed of the glass tube multiplied by a number of heating elements or forming tools in the processing station multiplied by the active time. An absolute difference between the exposure index and a nearest integer is less than or equal to 0.30, which reduces temperature and dimensional inhomogeneity around a circumference of the glass tube.

18 Claims, 11 Drawing Sheets

(56) References Cited

U.S. PATENT DOCUMENTS

| | | | |
|---|---|---|---|
| 2019/0161384 A1* | 5/2019 | McEnroe | C03B 23/099 |
| 2019/0162524 A1* | 5/2019 | Hepburn | G01B 11/08 |
| 2019/0248693 A1* | 8/2019 | Segner | C03B 23/099 |
| 2022/0048804 A1* | 2/2022 | Barnard | C03B 23/045 |
| 2022/0371936 A1* | 11/2022 | Barnard | C03B 23/043 |

* cited by examiner

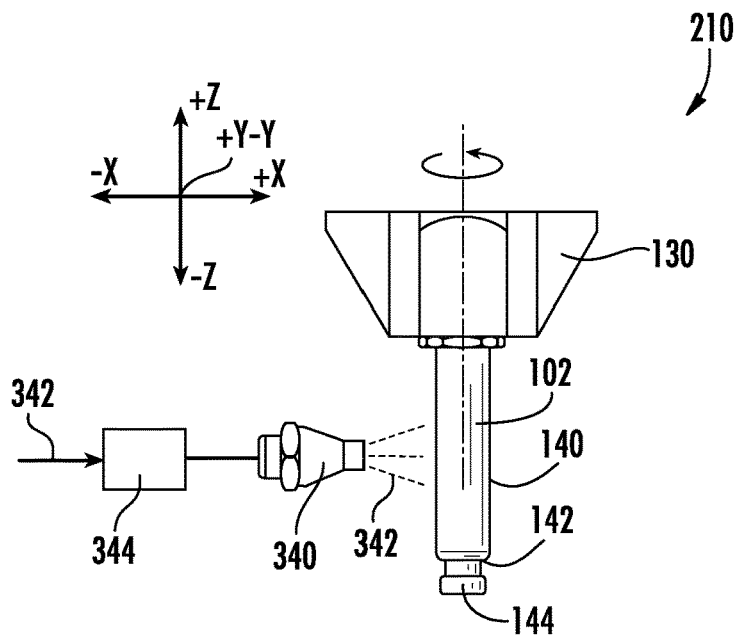
FIG. 3D
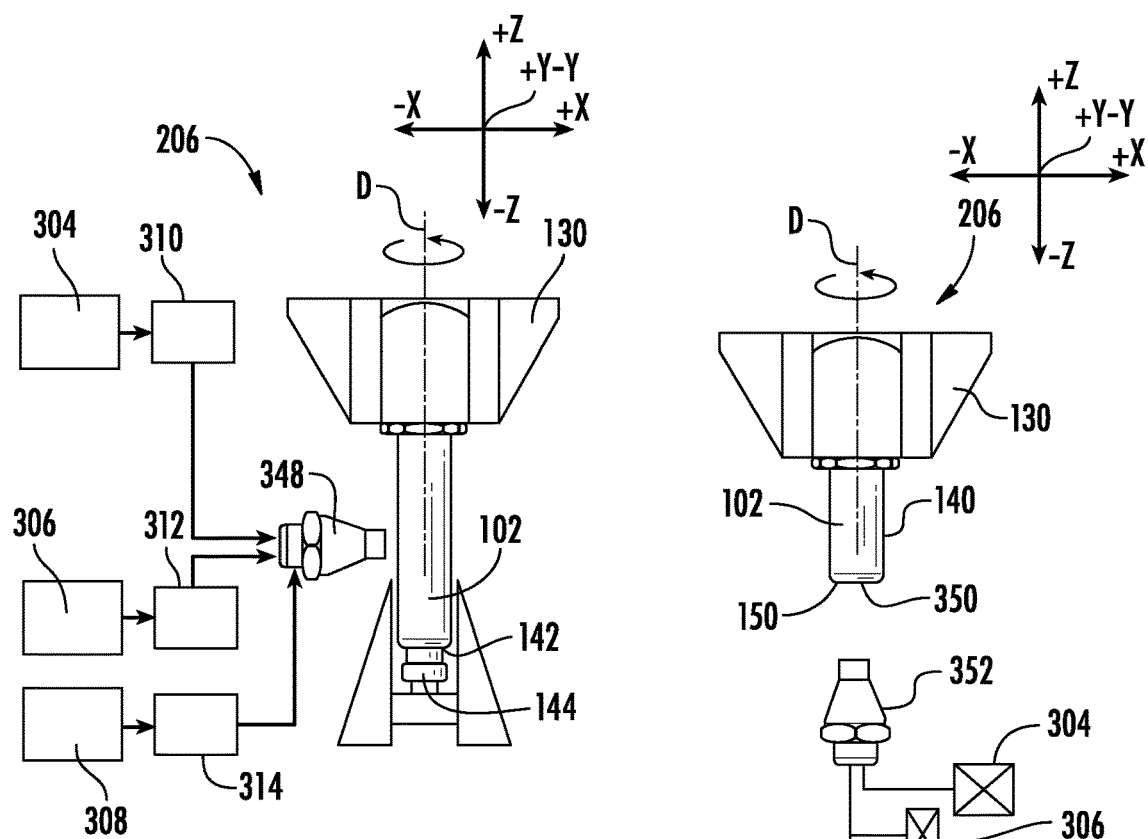
FIG. 3E
FIG. 3F

METHODS TO CONTROL SHAPE UNIFORMITY IN GLASS TUBE CONVERTING PROCESSES

CROSS-REFERENCE TO RELATED APPLICATIONS

This application claims the benefit of priority under 35 U.S.C. § 119 of U.S. Provisional Application Ser. No. 63/064,631 filed on Aug. 12, 2020, the content of which is relied upon and incorporated herein by reference in its entirety.

FIELD

The present specification generally relates to systems and methods for producing glass articles from glass tubes, in particular, systems and methods for controlling shape uniformity in glass tube converting processes.

TECHNICAL BACKGROUND

Historically, glass has been used as the preferred material for packaging pharmaceuticals because of its hermeticity, optical clarity, and excellent chemical durability relative to other materials. Specifically, the glass used in pharmaceutical packaging must have adequate chemical durability to prevent effecting the stability of the pharmaceutical formulations contained therein. Glasses having suitable chemical durability include those glass compositions within the ASTM standard 'Type IA' and 'Type IB' glass compositions, which have a proven history of chemical durability.

Glass tubing may be converted into other glass articles, such as various glass containers for use in pharmaceutical applications including, without limitation, vials, syringes, ampoules, cartridges and other glass articles. The glass tubing may be converted, for example, in "converting machines." Converting machines have been used for over 75 years, and are currently made by various commercial and internal equipment suppliers. These converting machines typically reform long lengths of glass tube into a plurality of glass articles using steps that include flame working, rotating and stationary tool forming, thermal separation, or score and shock cutoff steps. Various burners and forming tools are often used to shape one or more articles from the glass tube and separate the article from the glass tube.

SUMMARY

During the converting process, the thermal and dimensional inhomogeneity around a circumference of the glass tube is a concern and can lead to mass and shape asymmetry in the forming process for producing glass articles from the glass tube. These concerns are particularly apparent at greater process throughput. These concerns may also arise when increasing the size of the glass tube, such as increasing the outside diameter. Throughout the process to convert the glass tube to one or more articles, the glass tube is rotated about a center axis of the glass tube. For greater process throughput, the glass tube spends less time in each processing station. Also, when the outside diameter of the glass tube is increased, the rotational speed of the glass tube is generally reduced. In both situations, the number of rotations of the glass tube in each processing station may be reduced, which can lead to temperature and dimensional non-uniformity around the circumference of the glass tube during forming. Temperature and dimensional inhomogeneity can result in mass and shape asymmetry in the finished articles produced from the glass tube. Accordingly, a need exists for systems and methods for converting glass tubes into glass articles, such as pharmaceutical packaging, while reducing temperature and dimensional variations of the glass tube around the circumference of the glass tube.

In a first aspect of the present disclosure, a method for producing a plurality of glass articles from glass tube may include securing a glass tube in a holder of a converter comprising a plurality of processing stations. The processing stations may include at least one heating station and at least one forming station. The method may further include rotating the glass tube about a center axis of the glass tube in the holder and passing the glass tube through each of the plurality of processing stations to form one or more features at a working end of the glass tube. For any one of the plurality of processing stations, an active time of the processing station may be an amount of time the glass tube is maintained in engagement with at least one heating element or at least one forming tool while in the processing station, an exposure index for the processing station may be equal to the rotational speed of the glass tube within the holder multiplied by a number of heating elements or a number of forming tools in the processing station and multiplied by the active time of the glass tube in the processing station, and an absolute difference between the exposure index and a nearest integer is less than or equal to 0.30.

A second aspect may include the first aspect, further comprising identifying a temperature or dimensional inhomogeneity in the glass tube around a circumference of the glass tube, determining the exposure index for the glass tube in one or more of the plurality of processing stations, comparing the exposure index to the nearest integer, and adjusting a rotational speed of the glass tube, the active time, or both to maintain the absolute difference between the exposure index and the nearest integer less than or equal to 0.30.

A third aspect may include either one of the first or second aspects, comprising maintaining the exposure index within +/−0.30 of the nearest integer, wherein maintaining the exposure index within +/−0.30 of the nearest integer may reduce instability in rotation of the glass tube and variations in temperature circumferentially around the glass tube.

A fourth aspect may include any one of the previous aspects, wherein the exposure index may be equal to an integer.

A fifth aspect may include any one of the previous aspects, wherein the converter may comprise a plurality of holders and the method may include securing a plurality of glass tubes in the plurality of holders and passing each of the plurality of holders and the plurality of glass tubes through the plurality of processing stations.

A sixth aspect may include any one of the previous aspects, comprising maintaining the active time constant for each of the plurality of glass tubes in each of the plurality of processing stations and adjusting a rotational speed of each of the plurality of glass tubes to maintain the absolute difference between the exposure index and the nearest integer less than or equal to 0.30 for each of the plurality of glass tubes in each of the plurality of processing stations, which may reduce temperature and dimensional inhomogeneity in the glass tube around a circumference of the glass tube.

A seventh aspect may include any one of the first through fifth aspects, comprising changing an active time for each of the plurality of glass tubes in one or more of the plurality of processing stations to maintain the absolute difference between the exposure index and the nearest integer less than or equal to 0.30 for each of the plurality of glass tubes in each of the plurality of processing stations to reduce temperature and dimensional inhomogeneity in the glass tube around a circumference of the glass tube.

An eighth aspect may include any one of the previous aspects, wherein each of the plurality of processing stations may be in a fixed position and the converter may index the glass tube to each of the plurality of processing stations sequentially.

A ninth aspect may include any one of the first through seventh aspects, wherein the converter may translate the glass tube continuously through the processing stations, and each of the plurality of processing stations may move in coordination with translation of the glass tube during the active time.

In a tenth aspect of the present disclosure, a system for producing a plurality of glass articles from glass tube may include a converter having a plurality of processing stations that may include at least one heating station, at least one forming station, and a separating station. The system may further include a plurality of holders, each of the plurality of holders operable to secure a glass tube and rotate the glass tube about a center axis of the glass tube. The converter may be operable to move the plurality of holders and glass tubes through the plurality of processing stations. Each of the plurality of processing stations may have an exposure index defined as a rotational speed of the glass tube within the holder in units of rotations per time multiplied by a number of heating elements or a number of forming tools contacting an outer surface of the glass tube in the processing station and multiplied by the active time of the glass tube in the processing station. The active time of the processing station may be an amount of time the glass tube is maintained in engagement with at least one heating element or at least one forming tool while in the processing station. An absolute difference between the exposure index and a nearest integer may be less than or equal to 0.30 for each of the plurality of processing stations.

An eleventh aspect may include the tenth aspect, wherein the converter may be an index converter operable to index the glass tube through each of the plurality of processing stations.

A twelfth aspect may include the eleventh aspect, wherein the active time may be less than or equal to a dwell time of the converter.

A thirteenth aspect may include the tenth aspect, wherein the converter may be a continuous converter operable to continuously translate the glass tube through the plurality of processing stations.

A fourteenth aspect may include any one of the tenth through thirteenth aspects, wherein the at least one heating station of the converter may comprise at least one swivel burner that may be operatively coupled to a swivel burner actuator operable to pivot the swivel burner into and out of engagement with the glass tube in the at least one heating station, which may change the active time of the glass tube in the at least one heating station.

A fifteenth aspect may include any one of the tenth through thirteenth aspects, wherein the at least one heating station of the converter may comprise a burner translation system operable to translate at least one burner horizontally or vertically into and out of engagement with the glass tube, which may change the active time of the glass tube in the at least one heating station.

A sixteenth aspect may include any one of the first through fifteenth aspects, wherein the at least one heating station of the converter may include 1, 2, 3, 4, or more than 4 heating elements.

A seventeenth aspect may include any one of the first through sixteenth aspects, wherein the at least one forming station of the converter may comprise at least one forming tool that may be operatively coupled to a forming tool actuator that may be operable to translate the forming tool into and out of engagement with the glass tube, which may change the active time of the glass tube in the at least one forming station.

An eighteenth aspect may include any one of the tenth through seventeenth aspects, wherein the converter may comprise a measuring system that may be operable to determine at least a temperature of the glass tube, at least a dimension of the glass tube, or combinations of these around a circumference of the glass tube.

A nineteenth aspect may include the eighteenth aspect, wherein the measuring system may be a thermal imaging system.

A twentieth aspect may include any one of the first through nineteenth aspects, further comprising a system controller that may be communicatively coupled to the converter. The system controller may include at least one processor and at least one storage medium containing computer readable and executable instructions which, when executed by the processor, may cause the system controller to automatically identify one or more temperature or dimensional inhomogeneity in the glass tube around a circumference of the glass tube, determine the exposure index of the glass tube for one or more of the plurality of processing stations, compare the exposure index for each of the one or more processing stations to a nearest integer, and adjust a rotational speed of the glass tube, an active time of the glass tube in the processing stations, or both to maintain an absolute difference between the exposure index and the nearest integer less than or equal to 0.30.

A twenty-first aspect may include the twentieth aspect, wherein the computer readable and executable instructions, when executed by the processor, may cause the system to adjust the rotational speed of the glass tube to adjust the exposure index for one or a plurality of the processing stations.

A twenty-second aspect may include either one of the twentieth or twenty-first aspects, wherein the computer readable and executable instructions, when executed by the processor, may cause the system to adjust the active time in one or more processing stations to adjust the exposure index.

A twenty-third aspect may include the twenty second aspect, wherein the converter may be an indexing converter operable to index the glass tube through each of the plurality of processing stations, and the computer readable and executable instructions, when executed by the processor, may cause the system to automatically increase or decrease the dwell time of the converter to increase or decrease the active time of the glass tube in the plurality of processing stations.

A twenty-fourth aspect may include any one of the twentieth through twenty-second aspects, wherein the computer readable and executable instructions, when executed by the processor, may cause the system to automatically adjust the active time of the at least one heating station by modifying the timing of moving the heating elements into and out of engagement with the glass tube.

A twenty-fifth aspect may include any one of the twentieth through twenty-fourth aspects, wherein the at least one heating station may comprise a swivel burner operatively coupled to a swivel burner actuator. The swivel burner actuator may be communicatively coupled to the system controller and may be operable to receive control signals from the system controller and pivot the swivel burner into and out of engagement with the glass tube.

A twenty-sixth aspect may include the twenty-fifth aspect, wherein the computer readable and executable instructions, when executed by the processor, may cause the system to automatically change the timing of pivoting the swivel burner into and out of engagement with the glass tube to change the active time of the glass tube in the heating station.

A twenty-seventh aspect may include any one of the first through twenty-sixth aspects, wherein the at least one forming station may comprise at least one forming tool operatively coupled to a forming tool actuator, where the forming tool actuator may be communicatively coupled to the system controller and may be operable to receive one or more control signals from the system controller and translate the forming tool into and out of engagement with the glass tube.

A twenty-eighth aspect may include the twenty-seventh aspect, wherein the computer readable and executable instructions, when executed by the processor, may cause the system to automatically change the timing of translating the forming tools into and out of engagement with the glass tube to change the active time of the glass tube in the forming station.

A twenty-ninth aspect may include any one of the twentieth through twenty-eighth aspects, wherein the converter may comprise a measuring system disposed proximate the at least one heating station, the at least one forming station, or both, wherein the measuring system may be communicatively coupled to the system controller and may be operable to measure at least one property of the glass tube around a circumference of the glass tube and transmit a signal to the system controller indicative of the property to the system controller.

A thirtieth aspect may include the twenty-ninth aspect, wherein the at least one property of the glass tube may comprises at least one temperature, at least one dimension, or both around the circumference of the glass tube.

A thirty-first aspect may include either one of the twenty-ninth or thirtieth aspects, wherein the computer readable and executable instructions, when executed by the processor, may cause the system to automatically receive a signal from the measuring system indicative of the one or more properties of the glass tube, determine a variability of the property of the glass tube around a circumference of the glass tube, and adjust the active time, the rotational speed of the glass tube about the center axis, or both in the processing station to modify the exposure index in response to the variability of the property of the glass tube.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3D schematically depicts a cooling station of the converter of FIG. 1, according to one or more embodiments shown and described herein;

FIG. 3E schematically depicts a separating station of the converter of FIG. 1, according to one or more embodiments shown and described herein;

FIG. 3F schematically depicts a piercing station of the converter of FIG. 1, according to one or more embodiments shown and described herein;

DETAILED DESCRIPTION

Figure 1:
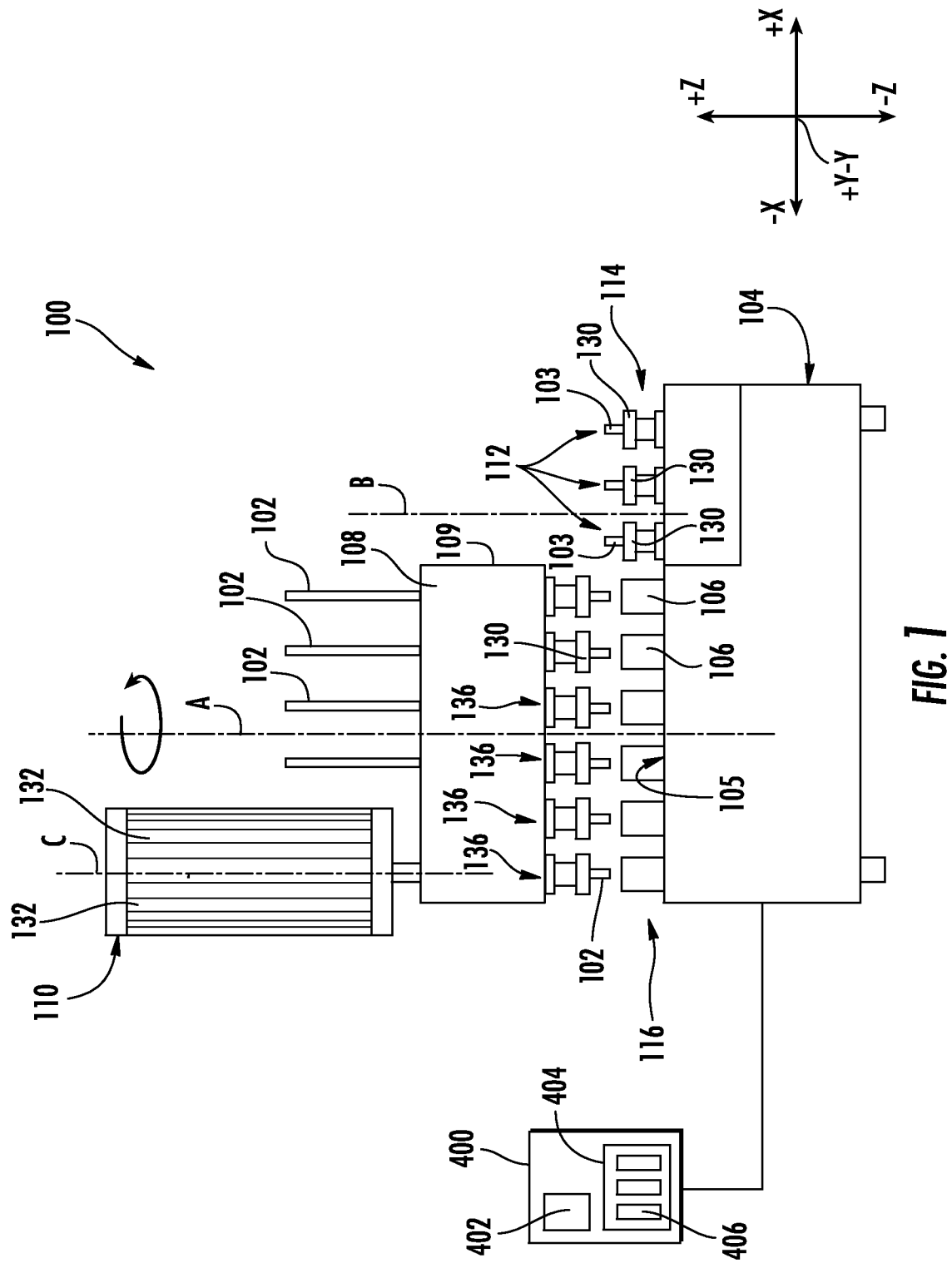
FIG. 1 schematically depicts an embodiment of a converter for producing glass articles from glass tubes, according to one or more embodiments shown and described herein.

Reference will now be made in detail to embodiments of systems and methods for controlling shape uniformity to reduce dimensional variability in glass articles produced from converting processes for converting glass tube into glass articles, examples of which are illustrated in the accompanying drawings. Whenever possible, the same reference numerals will be used throughout the drawings to refer to the same or like parts. The methods disclosed herein for producing a plurality of glass articles from glass tube may include securing a glass tube in a holder of a converter comprising a plurality of processing stations, which may include at least one heating station and at least one forming station. The methods may further include rotating the glass tube about a center axis of the glass tube in the holder and passing the glass tube through each of the plurality of processing stations to form one or more features at a working end of the glass tube. For any one of the plurality of processing stations, an active time of the processing station may be an amount of time the glass tube is maintained in engagement with at least one heating element or at least one forming tool while in the processing station. An exposure index for the processing station may be equal to the rotational speed of the glass tube within the holder in units of rotations per second multiplied by a number of heating elements or a number of forming tools in the processing station and multiplied by the active time of the glass tube in the processing station. For any one of the plurality of processing stations, an absolute difference between the exposure index and a nearest integer may be less than or equal to 0.30. Maintaining the absolute difference between the exposure index and the nearest integer less than or equal to 0.30 may reduce temperature and dimensional inhomogeneity around the circumference of the glass tube. Various methods for producing glass articles from glass tube will be described herein with specific reference to the appended drawings.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "working end" of the glass tube is the end of the glass tube oriented towards the processing stations of the converter relative to the holder, and the "non-working end" of the glass tube is the end of the glass tube oriented away from the processing station.

As used herein, a "dwell time" of the converter refers to the duration of time that the glass tube spends in a particular processing station before passing to the next subsequent processing station.

As used herein, the term "active time" refers to a duration of time that the glass tube is maintained in engagement with at least one heating element or at least one forming tool while in a particular processing station.

When used in relation to a heating station, "engagement" of the burner 302 with the glass tube 102 may refer to placing the burner 302 in a position in which the flame from the burner 302 extends towards the glass tube 102 or contacts the glass tube 102 to heat the glass tube 102. Conversely, when the burner 302 is out of engagement with the glass tube 102, the burner 302 is placed in a position in which the flame from the burner 302 is directed away from the glass tube 102 or moved far enough away from the glass tube 102 so that the flame does not contact or directly heat the glass tube 102. Some heat transfer from the burner 302 to the glass tube 102 may still occur when the burner 302 is out of engagement with the glass tube 102, but this heating is incidental and minimal compared to heating of the glass tube 102 when the burner 102 is in engagement with the glass tube 102. The term "engagement" as described above for burners 302 applies equally to other types of heating elements 301.

When used in relation to forming tools 324 in a forming station 204, the term "engagement" refers to the forming tools 324 contacting the glass tube 102. When a forming tool 324 is out of engagement, the forming tool 324 does not contact the glass tube 102.

As used herein, the term "part rate" refers to the production rate or throughput rate of the converter in units of number of glass articles per unit time.

As used herein, the term "circumference" of the glass tube refers to a collection of points of the glass tube 102 at constant radius r from the center axis D of the glass tube 102 at a particular Z position (i.e., position on the +/−Z axis of the figures) through 360 degrees. A circumference of the glass tube 102 may coincide with an outer surface 140 of the glass tube 102 at a particular Z position or an inner surface 146 of the glass tube 102 at a specific Z position, for example.

Glass tubing may be converted into glass articles, in particular glass articles for use in pharmaceutical applications, which may include, without limitation, vials, syringes, ampoules, cartridges and other glass articles. The glass tubing may be converted into these glass articles using a converter, such as a converting machine, comprising a plurality of processing stations. The processing stations may include heating stations, forming stations, thermal separating stations, and piercing stations, among other types of processing stations. The converting machines typically reform long glass tube lengths into a plurality of glass articles using steps that include, but are not limited to, flame working, rotating and stationary tool forming, thermal separation, or score and shock cut-off steps. Thus, glass articles produced through a converting process conducted on a converting machine are subjected to a series of flame burners or other heating elements and forming tools to shape the glass tube to specific shapes and dimensions and separate a formed article from the glass tube.

Referring now to FIG. 1, the converter 100 for producing glass articles from a glass tube 102 is schematically depicted. The converter 100 may be used to convert glass tubes 102 into a plurality of glass articles. The converter 100 may include a base 104 having a plurality of processing stations 106 and a main turret 108 positioned above the base 104 and rotatable relative to the base 104 about the central axis A. The converter 100 may further include a glass tube loading turret 110 positioned above the main turret 108 for feeding glass tubes 102 to the main turret 108. The converter 100 may also include a plurality of secondary processing stations 112 on the base 104 and a secondary turret 114, which may be rotatable relative to the base 104.

As schematically depicted in FIG. 1, the base 104 of the converter 100 may be stationary and the processing stations 106 may be coupled to an upper portion 105 of the base 104. The plurality of processing stations 106 may be spaced apart from one another and arranged in a main circuit 116. In one or more embodiments, the main circuit 116 may be circular so that the main turret 108 may index or continuously move a glass tube 102 through the plurality of processing stations 106 by rotation of the main turret 108 about the central axis A. Alternatively, in other embodiments, the main circuit 116 may be linear. Although described herein in reference to a circular-shaped layout of processing stations 106, it is understood that the subject matter disclosed herein may apply equally well to converters having other arrangements of the processing stations 106, such as linear, curvilinear, or irregular-shaped arrangements of processing stations 106.

The type and/or shape of the article to be made from the glass tube 102 may influence the number of processing stations 106 of the converter 100. The number of processing stations 106 of the main turret 108 may be from 14 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, measuring, feeding, discharge stations, other processing stations, or combinations of these for producing the glass articles from the glass tubes 102. The type and/or shape of the article to be made from the glass tube 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 may include a plurality of holders 130, which are configured to removably secure each glass tube 102 to the main turret 108. The holders 130 may be clamps, chucks, or other holding devices, or combinations of holding devices. The holders 130 may orient each glass tube 102 so that the glass tube 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle. Each of the holders 130 may extend from a bottom portion 109 of the main turret 108 in a direction towards the base 104 (i.e., in the −Z direction relative to the coordinate axis in FIG. 1), and each holder 130 may be oriented to position the glass tube 102 in or proximate to each of the successive processing stations 106 of the main circuit 116 of the base 104 as the main turret 108 is indexed about the central axis A. Vertical orientation of the glass tubes 102 allows a downward protruding portion of each glass tube 102 to be moved or indexed progressively through the processing stations 106. In embodiments, the converter 100 may be operable to index each of the plurality of holders 130 progressively through the plurality of processing stations 106. Alternatively, in embodiments, the converter 100 may be operable to translate the plurality of holders 130 continuously through the converting process. Each holder 130 may be individually rotatable relative to the main turret 108 to rotate the glass tube 102 about center axis D of the glass tube 102, which may be generally parallel to the central axis A of the main turret 108. Each of the holders 130 may be operatively coupled to a motor (not shown), continuous drive belt, or other drive mechanism for rotation of each of the holders 130 relative to the main turret 108. Rotation of the holders 130 allows for rotation of the glass tube 102 about center axis D of the glass tube 102 relative to stationary burners, forming tools, cooling nozzles, or other features of the processing stations 106. The heating element or forming tools in the processing station 106 may be maintained in a fixed position relative to the glass tube 102, and the rotation of the glass tube 102 about center axis D may enable exposure of the entire circumference of the glass tube 102 to the heating elements or forming tools.

Figure 2:
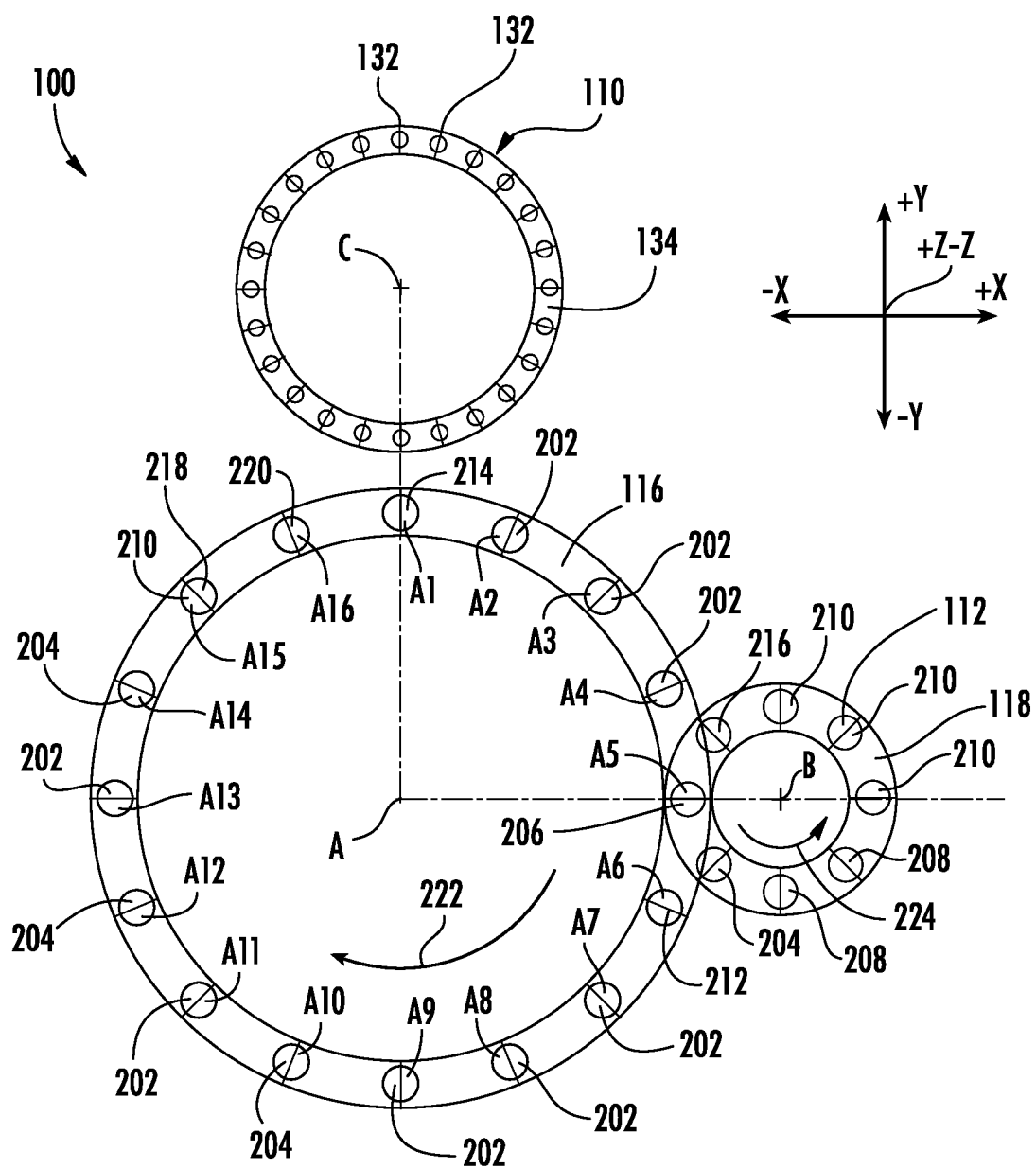
FIG. 2 schematically depicts a top view of a main turret, a secondary turret, and a feed turret of the converter of FIG. 1, according to one or more embodiments shown and described herein.

Referring to FIGS. 1 and 2, the converter 100 may include a plurality of secondary processing stations 112, which may also be spaced apart and arranged in a secondary circuit 118 (FIG. 2). The converter 100 may include a secondary turret 114 (FIG. 1) for indexing or continuously moving an article 103 (FIG. 1), which has been separated from the glass tube 102, through the plurality of secondary processing stations 112. The secondary turret 114 may be rotatable about a second axis B relative to the base 104. The second axis B may be generally parallel to central axis A of the main turret 108. The secondary turret 114 may also include a plurality of holders 130 to hold the glass articles 103 and position the glass articles 103 to engage with each of the secondary processing stations 112 in succession. The secondary turret 114 may receive the articles 103 from a separating station 206 (FIG. 2) of the main turret 108, index or continuously move the articles 103 through the plurality of secondary processing stations 112 through rotation of the secondary turret 114, and discharge the finished articles from the converter 100.

The glass tube loading turret 110 may be positioned adjacent to the main turret 108. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. Referring to FIGS. 1 and 2, in some embodiments, the glass tube loading turret 110 may include a plurality of loading channels 132 arranged in a circular circuit 134 and configured to hold glass tubes 102. The glass tube loading turret 110 may be positioned to orient one of the loading channels 132 into vertical alignment (i.e., aligned in a direction parallel to the central axis A of the main turret 108 and/or parallel to the Z axis of FIG. 1) with a processing station 106 of the main circuit 116 of the converter 100 and the corresponding holders 130 on the main turret 108 that are moved through the processing station 106 of the main circuit 116. In one or more embodiments, the processing station 106 aligned with the glass tube loading turret 110 may be a tube loading station 214 (FIG. 2). When the converter 100 has converted all or at least a portion of the glass tube 102 at a specific holder position 136 into one or more articles, the glass tube loading turret 110 may deliver a new length of glass tube 102 through the top of the main turret 108 to the holder 130 at the holder position 136, when the holder position 136 indexes into alignment with the tube loading station 214 (FIG. 2) of the main circuit 116. In alternative embodiments, the converter 100 may include an arm (not shown) movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods and apparatuses for delivering new lengths of glass tube 102 to the main turret 108 are contemplated.

Referring to FIG. 2, as previously described, the plurality of processing stations 106 of the converter 100 may include one or more heating stations 202, forming stations 204, separating stations 206, cooling stations 210, piercing stations 212, tube loading stations 214, discharge stations 216, measuring stations 218, tube length drop stations 220, or other stations and/or combinations of these stations. FIG. 2 schematically depicts the arrangement of the processing stations 106 for a converter 100 having a main circuit 116 of sixteen processing stations 106 and a secondary circuit 118 of eight secondary processing stations 112. As previously described, the processing stations 106 of the main circuit 116 may be evenly spaced apart and evenly distributed about a circular circuit, and the secondary processing stations 112 of the secondary circuit 118 may also be evenly spaced apart and evenly distributed about a circular circuit. FIG. 2 also schematically depicts the glass tube loading turret 110 having a plurality of loading channels 132. In FIG. 2, the glass tube loading turret 110 is shown in a position spaced apart from the main circuit 116 for purposes of illustration. Although the glass tube loading turret 110 is depicted as having twenty-four loading channels 132, it is understood that the glass tube loading turret may have more or less than twenty-four loading channels 132.

The main circuit 116 of the converter schematically depicted in FIG. 2 may include one or more heating stations 202, a separating station 206, a piercing station 212, one or more forming stations 204, one or more cooling stations 210, a measuring station 218, a tube length drop station 220, and a tube loading station 214. Although FIG. 2 depicts the main circuit 116 as having a circular arrangement of the processing stations 106, as previously discussed, the main circuit 116 may have the processing stations 106 positioned in other-shaped arrangements, such as linear, curvilinear, irregular-shaped, or other arrangements. With respect to the direction of indexing 222 of the main turret 108, the heating stations 202 may be positioned before each of the forming stations 204 and the separating stations 206 to preheat target regions of the glass tube 102 to a target temperature at which the target region of the glass tube 102 becomes viscous and deformable and may effectively be shaped or stretched and separated. At the separating station 206, the formed glass article 103 (FIG. 1) may be separated from the glass tube 102 (FIG. 1) as its bottom is concurrently formed. The separating station 206 may also be the processing station 106 at which the partially formed glass article 103, once separated, is transferred to the secondary turret 114 (FIG. 1) to be indexed through the secondary circuit 118 of secondary processing stations 112. The piercing station 212 may be positioned on the main circuit 116 downstream of the separating station 206 in the direction of indexing 222 of the main turret 108. At the piercing station 212, a meniscus 350 of the glass tube 102 previously formed in the separating station 206 is pierced, thereby reopening the working end 150 of the glass tube 102.

The forming stations 204 of the main turret 108 may be positioned downstream of the piercing station 212 and one or more heating stations 202 in the direction of indexing 222. The one or more forming stations 204 may iteratively shape the glass tube 102 to form one or more features of the finished glass article. As noted above, one or more heating stations 202 may be positioned before each of the forming stations 204 to preheat target regions of the glass tube 102 to a temperature at which the glass tube 102 may be shaped and formed into the desired features. The forming stations 204 of the main turret 108 may shape the working end 150 (FIG. 3A) of the glass tube 102 to form features at one end of the glass articles 103, and the forming stations 204 of the secondary turret 114 may shape the other end of the glass articles 103 after the glass article 103 has been separated from the glass tube 102. In embodiments, the converter 100 may be used to produce vials from the glass tubes 102, and the forming stations 204 of the converter 100 may include one or more shoulder forming stations, flange forming stations, flange finishing stations, or combinations of these with one or more heating stations 202 positioned before and between each of the forming stations 204.

The main circuit 116 may further include a measuring station 218, at which a dimensioning system (not shown) may be used to measure one or more dimensions of the glass tube 102, such as the diameter and thickness for example, and one or more dimensions of the features formed by the forming stations 204. Feature dimensions may include flange thickness, flange length, neck length, neck thickness, overall article length, other feature dimension, or combinations thereof. The measuring station 218 may be positioned directly after the last forming station 204 so that the dimensions are measured while the glass tube 102 is still at elevated temperature. Alternatively, the measuring station 218 may be positioned after one or more cooling stations 210 to measure the dimensions of the glass tube 102 and/or glass article at a lower temperature.

Still referring to FIG. 2, one or more cooling stations 210 may be positioned after the forming stations 204 in the direction of indexing 222 of the main turret 108. A tube length drop station 220 may be positioned after the forming stations 204, between the forming stations 204 and the separating station 206, to drop the partially formed glass tube 102 down, thereby positioning the glass tube 102 for separating the glass article 103 from the glass tube 102 at the separating station 206. The main circuit 116 may also include a tube loading station 214 for loading a new length of glass tube 102 feedstock from the glass tube loading turret 110 to the main turret 108 (FIG. 1). In embodiments, the tube loading station 214 may be incorporated into a cooling station 210. The tube loading station 214 may be positioned between the last forming station 204 and the separating station 206.

Figure 3A:
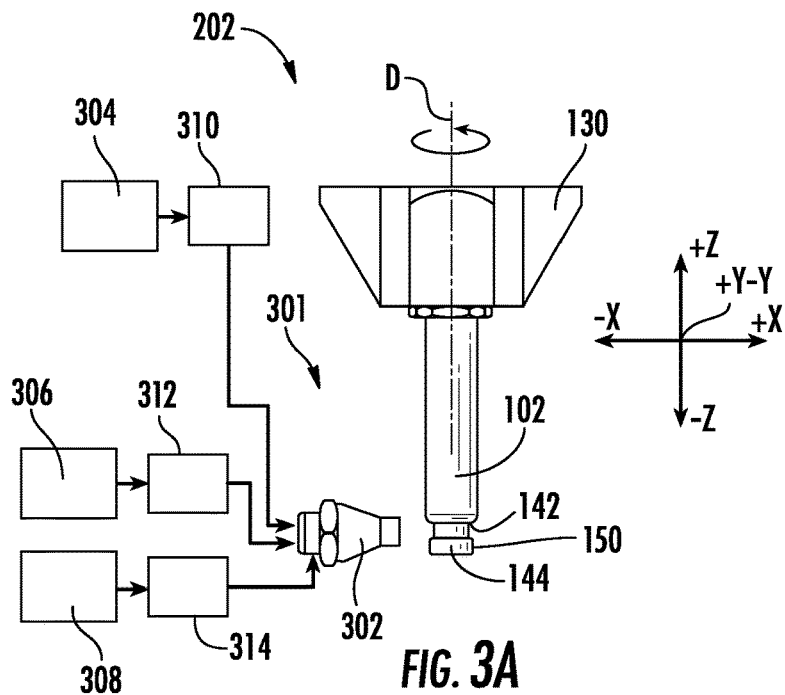
FIG. 3A schematically depicts a heating station of the converter of FIG. 1, according to one or more embodiments shown and described herein.

The forming stations 204 of the main turret 108 can form features at a first end of the glass article 103. For example, the forming stations 204 may form the shoulder 142 and flange 144 at the top (first end) of a glass article 103 that is a vial or cartridge, as shown in FIG. 3A. Referring again to FIG. 2, once the glass article 103 is separated from the glass tube 102 at the separating station 206, the glass article 103 may be transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103. The secondary turret 114 may rotate about the axis B in a direction 224 that is opposite from the main turret 108. In embodiments, the secondary turret 114 may rotate in a direction that is the same as the main turret 108.

The secondary processing stations of the secondary circuit may include one or more heating stations 202, forming stations 204, polishing stations 208, cooling stations 210, discharge stations 216, or other stations or combinations of secondary processing stations 112. Although FIG. 2 depicts the secondary circuit as having a circular arrangement of the secondary processing stations 112, as previously discussed, the secondary circuit may have the secondary processing stations 112 positioned in other-shaped arrangements, such as linear, curvilinear, irregular-shaped, or other arrangements. In embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article 103 may be discharged from the converter 100.

The previous description of the processing stations 106 of the main circuit 116 and the secondary processing stations 112 of the secondary circuit 118 may represent a typical converter 100 for producing vials from the glass tube 102. However, it is understood that more or fewer processing stations 106 and secondary processing stations 112 may be utilized to make vials having different shapes or features or other glass articles, such as cartridges, syringes, ampoules, or other pharmaceutical glass articles. Additionally, it is understood that the processing stations 106 and secondary processing stations 112 may be arranged in any of a number of different orders and/or configurations in order to produce differently shaped glass articles.

Referring now to FIG. 3A, a heating station 202 of the converter 100 is schematically depicted. Each of the heating stations 202 may include one or more heating elements 301. As illustrated in FIG. 3A, in embodiments, the heating element 301 may include one or more burners 302, which are used to heat targeted regions of the glass tube 102 prior to a forming operation performed at the forming station 204 (FIG. 2) or separating operation performed at the separating station 206 (FIG. 2). Although FIG. 3A depicts a single burner 302, it is understood that a plurality of burners 302 may be employed in a single heating station 202, as shown in FIGS. 6 and 7, which show two burners 302 and three burners 302, respectively. Referring again to FIG. 3A, each burner 302 may be fluidly coupled to a fuel supply 304, an oxygen supply 306, and, optionally, an air supply 308. Examples of fuels for the burner 302 may include, but are not limited to hydrogen, hydrocarbon fuel gases such as methane, propane, and butane for example, other fuels, or combinations of these. Each burner 302 may include a fuel control valve 310 to control the flow rate of fuel gas to the burner 302. Each burner 302 may also include an oxygen control valve 312 to control the mass flow rate of oxygen to the burner 302. Each burner 302 may further include an air control valve 314 for optionally controlling a flow rate of air to the burner 302. The burner 302 combusts the fuel gas in the presence of oxygen and/or air to produce a flame that heats at least the target region of the glass tube 102. Although the heating stations 202 of the converter 100 are described herein as heating the glass tube 102 using burners, it is understood that other heating elements or methods other than burners may be used to heat the glass tube 102.

Figure 3B:
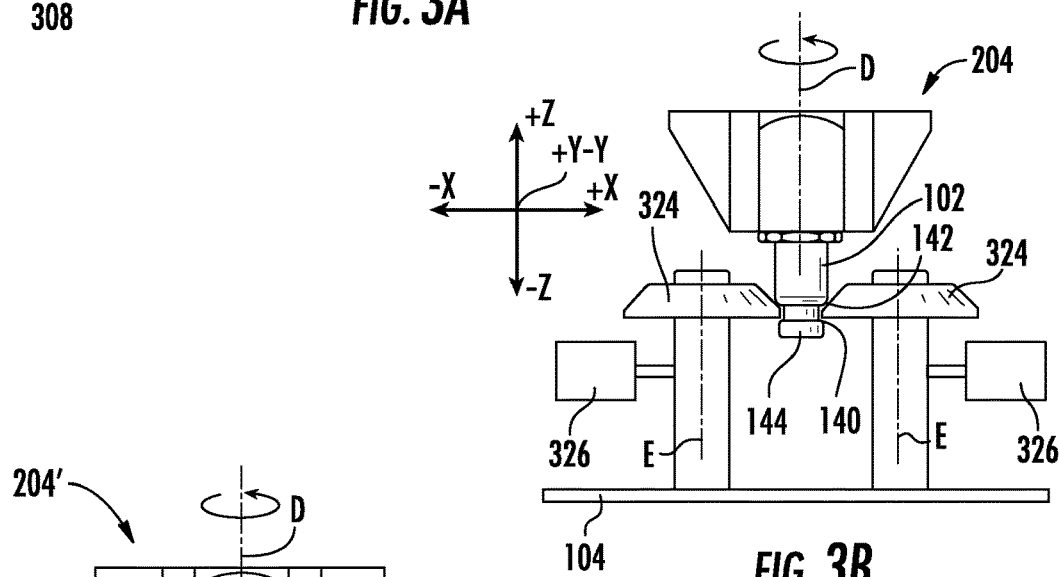
FIG. 3B schematically depicts a forming station of the converter of FIG. 1, according to one or more embodiments shown and described herein.
Figure 3C:
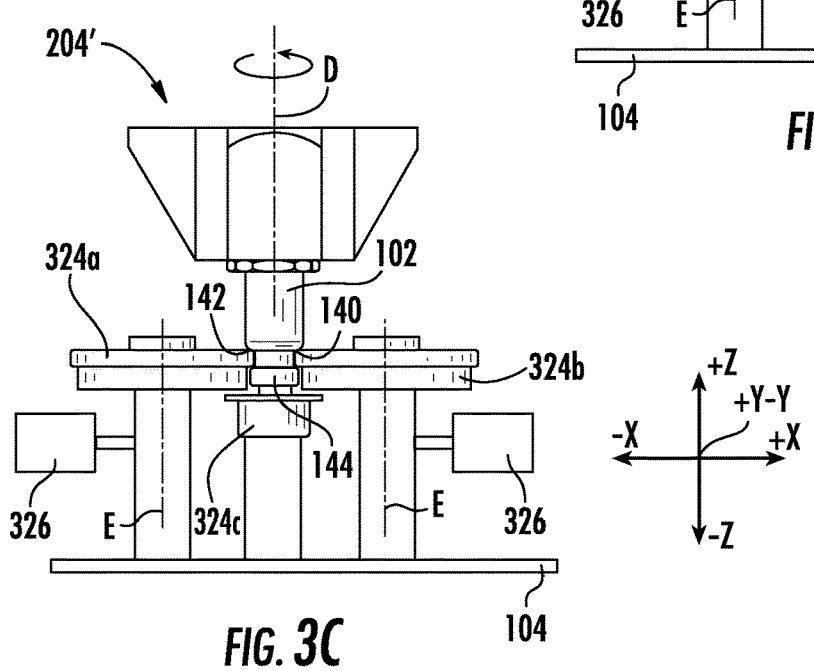
FIG. 3C schematically depicts another embodiment of a forming station of the converter of FIG. 1, according to one or more embodiments shown and described herein.

Referring now to FIGS. 3B and 3C, examples of forming stations 204 of the converter 100 are schematically depicted. Each forming station 204 may include one or more forming tools 324 rotatable relative to the base 104 (FIG. 1) about tooling axis E. When passed into the forming station 204, the glass tube 102, which has been heated in a prior heating station 202, is rotated by the holder 130. The forming tools 324 may engage with the outer surface 140 of the glass tube 102 as it rotates. When engaged, contact of the forming tools 324 with the outer surface 140 of the heated glass tube 102 may form the glass tube 102 into the desired shape. The forming tools 324 may be contacted with the glass tube 102 for an active time. Upon expiration of the active time, the forming tool actuators 326 may withdraw the forming tools 324 from engagement with the glass tube 102. FIG. 3B schematically illustrates an embodiment of a forming station 204 for forming the shoulder 142 of a glass vial formed from the glass tube 102. FIG. 3C schematically depicts an exemplary embodiment of a forming station 204' for forming the flange 144 of a glass vial formed from the glass tube 102. The forming station 204' for forming the flange 144 comprises three forming tools 324a, 324b, and 324c. Other types of forming tools 324 may be employed in the forming station 204 depending on the desired features of the article.

FIG. 3D schematically depicts a cooling station 210 having one or more cooling nozzles 340 positioned to direct a cooling fluid 342, such as chilled air or an inert gas for example, towards the glass tube 102. One or more of the cooling nozzles 340 may be positioned to direct the cooling fluid 342 to specific regions of the glass tube 102. One or more cooling fluid control valves 344 may be fluidly coupled to the cooling nozzles 340 to control the mass flow rate of cooling fluid 342 to the cooling nozzles 340, which enable control of the rate of cooling of the glass tube 102 as well as the temperature of the glass tube 102 and temperature gradients in the glass tube 102.

Referring now to FIG. 3E, a separating station 206 of the converter 100 is schematically depicted. The separating station 206 depicted in FIG. 3E is a thermal separation station and may be positioned after one or more heating stations 202 in the direction of indexing 222 of the main turret 108. The heating stations 202 positioned before the separating station 206 heat the glass tube 102 to make the glass viscous. The separating station 206 may include a separating burner 348. While the glass tube 102, which has been made viscously deformable by the previous heating stations 202, is rotated by the holder 130 about the center axis D of the glass tube 102, the separating burner 348 may be engaged with the outer surface 140 of the glass tube 102 to heat the glass tube 102 to a temperature at which the viscosity of the glass causes the article to separate from the glass tube 102. Once separated from the glass tube 102, the article may be transferred to the secondary turret 114 (FIG. 1) or discharged from the converter 100. Although shown in FIG. 3E as a thermal separating station, the separating station 206 may also be a non-thermal separating station such as a separating station using score and break techniques, as may be used for syringes and cartridges for example.

Referring now to FIG. 3F, a typical piercing station 212 of the converter 100 is schematically depicted. The piercing station 212 may be positioned after the separating station 206 in the direction of indexing 222 of the main turret 108. As previously described, thermal separation of the article 103 from the glass tube 102 in the separating station 206 may cause a meniscus 350 of glass to form across the working end 150 of the glass tube 102. In the piercing station, the meniscus 350 is pierced in preparation for forming the next article at the working end 150 of the glass tube 102. The piercing station 212 may include a piercing burner 352. The piercing burner 352 may be positioned below the working end 150 of the glass tube 102 and may be oriented toward the working end 150 of the glass tube 102. The piercing burner 352 may be fluidly coupled to one or more of a fuel gas supply 304, oxygen supply 306, air supply 308, or combinations of these. The fuel gas supply 304, the oxygen supply 306, and the air supply 308 were previously discussed in relation to the burner 302 of FIG. 3A. When main turret 108 indexes the glass tube 102 into the piercing station 212, the flame from the piercing burner 352 heats the meniscus 350 of glass and melts the meniscus 350 to pierce the meniscus 350 and re-open the working end 150 of the glass tube 102. In embodiments, the meniscus 350 may be pierced by directing a stream of gas, such as compressed air, nitrogen, argon, or other gas, at the meniscus 350 or across the meniscus 350. In embodiments, mechanical means or other methods may be used to pierce the meniscus 350.

FIGS. 3A-3F include schematic illustrations of several different examples of processing stations 106 that may be utilized in the converter 100. However, it should be understood that other processing stations 106 having different structures, combinations of structures, or functions, may be utilized to achieve the desired conversion of the glass tube 102 into one or more glass articles.

Figure 4:
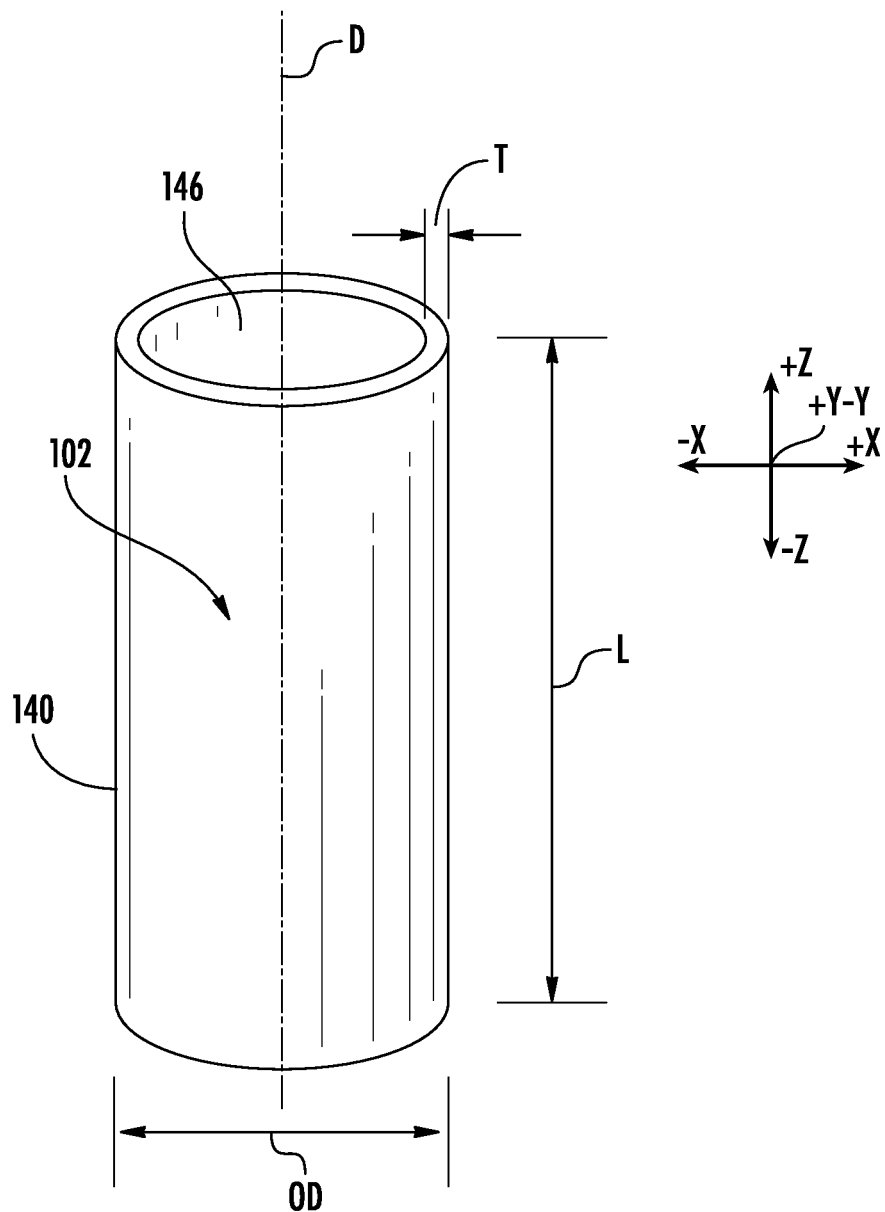
FIG. 4 schematically depicts a perspective view of a section of a glass tube prior to conversion in the converter of FIG. 1, according to one or more embodiments shown and described herein.

Referring to FIG. 4, the glass tube 102 may be an elongated hollow cylindrical tube made from glass. The glass tube 102 may have a circular cross-sectional shape and may have an outer surface 140, an inner surface 146, and a thickness t. The thickness t of the glass tube 102 may be a radial distance between the inner surface 146 and the outer surface 140 of the glass tube 102. The glass tube 102 may have a length L in the +/−Z direction of the coordinate axis of FIG. 4. The glass tube 102 may have an outside diameter OD as shown in FIG. 4. As previously discussed, the glass tube 102 is rotated about center axis D of the glass tube 102 throughout the converting process.

Referring again to FIGS. 1 and 2, in operation, the main turret 108 may index or move the glass tubes 102, which are secured in the holders 130, into a processing station 106. A specific operation, such as heating, forming, piercing, separating, cooling, dropping, feeding, measuring, etc. may be performed on the glass tubes 102 at each of the processing stations 106. As used herein, a "dwell time" of the converter 100 may refer to the time that the glass tube 102 spends in a particular processing station 106 before being indexed by the main turret 108 to the next subsequent processing station 106. The converter 100 may be tuned so that all of the processing stations 106 complete their operations within the dwell time. At the end of the dwell time, the main turret 108 may index the glass tubes 102 to the next processing stations 106. As used herein, the "index time" may refer to the time that it takes for the main turret 108 to index the glass tubes 102 from one processing station 106 to the next processing station 106 and is measured in units of time. For an indexing converter, the total time per part per station, as used in this disclosure, is the sum of the dwell time and the index time.

In embodiments, the converter 100 may be a continuous converter operable to move the glass tubes 102 and holders 130 continuously through the plurality of processing stations 106. In embodiments, the heating elements, burners, forming tools, measurements devices, and other elements of the converting process may move with the glass tube 102 as it passes through the processing station 106. For both an indexing converter and a continuous converter, an active time of the processing station is a duration of time that the glass tube 102 is maintained in engagement with at least one heating element or at least one forming tool while in the processing station 106.

Examples of converters 100 for converting glass tube 102 into glass vials include the Vial Forming Machine Models RP16 or RP18 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098 Vial Forming Machine manufactured by Euromatic S.R.L., which has 36 processing stations. Another example may include the Zeta 103 Cartridge Forming Machine manufactured by Euromatic S.R.L., which is a converter for converting glass tube into cartridges. The cartridge converter has similar characteristics to the previously described vial converters 100 but is utilized to produce glass articles having a cartridge form factor rather than a vial.

Although described in the context of a converter 100 for producing glass vials from glass tube 102, it should be understood that the converter 100 may be configured to produce one or more other articles, such as other types of pharmaceutical containers or articles, by changing the forming tools 324 and/or the order or configuration of processing stations 106 in the main circuit 116 or secondary processing stations 112 in one or more secondary circuits 118. Pharmaceutical articles may include, but are not limited to vials, cartridges, syringes, ampoules, jars, or other glass pharmaceutical articles.

During the converting process, thermal and dimensional inhomogeneity around the circumference of the glass tube 102 is a concern and can lead to mass and shape asymmetry in the forming process for producing glass articles from the glass tube 102. It has been observed that these concerns are particularly apparent at greater process throughput and for articles produced from increasingly larger glass tubes (e.g., increasing outside diameter (OD)). As previously discussed, the glass tube 102 is continually rotated about center axis D within the holder 130 as the glass tube 102 passes through the plurality of processing stations 106. As the throughput of the converter 100 increases, the glass tube 102 may spend less time in each processing station 106. For an indexing converter 100, increasing the part rate throughput of the converter 100 may include decreasing the dwell time, the index time, or both. In embodiments, the index time may be generally fixed and the part rate may be increased by decreasing the dwell time of the glass tube 102 in each processing station 106. For continuous converters, the part rate may be increased by increasing the rate at which the glass tube 102 is passed through the series of processing stations 106. Decreasing the dwell time of an indexing converter 100 or increasing the speed of a continuous converter may reduce the amount of time that the glass tube 102 spends in each processing station 106. As a consequence, the number of rotations of the glass tube 102 in each processing station 106 may be reduced for a given constant rotational speed of the glass tube 102.

In the case of increasing the OD of the glass tubes, as the outside diameter of the glass tube is increased, the rotation speed of the glass tube 102 is generally decreased. However, at constant throughput of the converter 100, reducing the rotational speed of the glass tube 102 in the holder 130 may also reduce the number of rotations of the glass tube 102 in each processing station 106.

Thus, increasing throughput rate of the converter 100, increasing tube diameter or the glass tube 102, or both, may lead to a decrease in the number of rotations of the glass tube 102 in each processing stations 106. Reducing the number of rotations of the glass tube 102 in a processing station 106 may reduce a number of times that a point on the outer surface of the glass tube 102 engages with the burners 302 or forming tools 324 in the processing station 106. This can lead to temperature non-uniformity in the glass tube 102 around the circumference of the glass tube 102 during forming, which can result in mass and shape asymmetry in the finished articles produced therefrom.

The variation in glass tube temperature around the circumference of the glass tube 102 and the resulting dimensional and cosmetic variations can constrain the operating window of the converting process, decrease the process capability (Cpk), decrease yields, or combinations of these. The decreases in yield may result from lesser production rates to reduce the temperature and/or dimensional inhomogeneity around the glass tube 102 or yield loss due to the dimensional and cosmetic variations that cause the articles to be out-of-specification. For certain nominal vial or glass article dimensions run under certain process conditions, the yield loss from dimensional and cosmetic variations caused by temperature variation in the glass tubes 102 during converting can be greater than 30%.

It has been discovered that certain combinations of part rate and rotational speed of the glass tube 102 in the holder 130 can lead to highly unstable rotation of the heated portions of the glass tube 102, which may be referred to as the preform regions of the glass tube 102. At these certain combinations of part rate and rotational speed, it has been observed that the bottom portion of the preform region (i.e., portion of preform region in the −Z direction of the coordinate axis in the drawings) can move significantly from side-to-side and up-and-down as the glass tube 102 is rotated in the holder 130. This phenomenon is commonly referred to as "wobble" in the converting process. Wobble can be most pronounced in the final heating station prior to forming or in processing stations following shoulder forming during production of vials and cartridges. Wobble may result from inconsistent heating of the glass tube 102 in the heating stations 202, inconsistent contact with forming tools in forming stations 204, or both.

Figure 5:
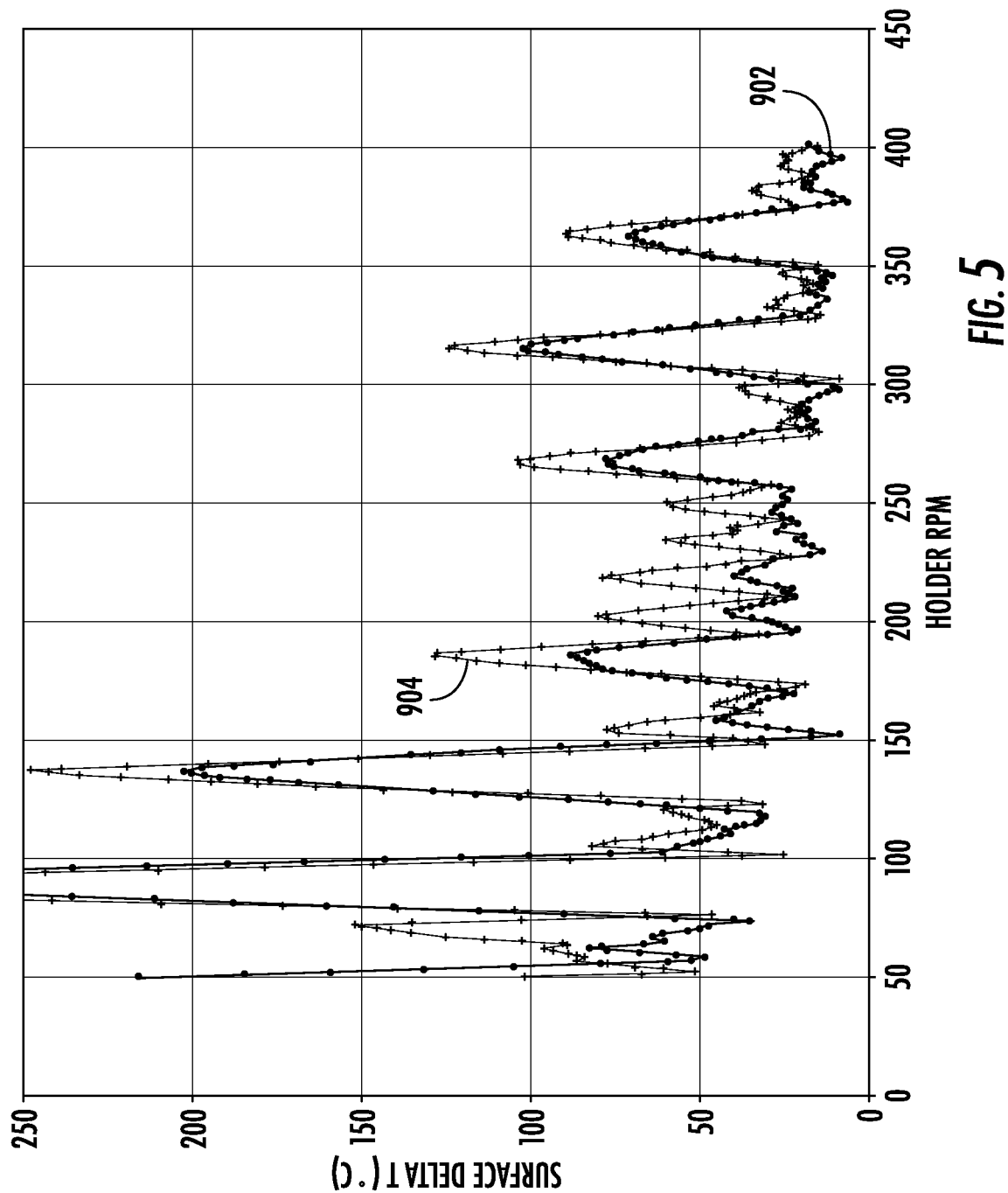
FIG. 5 graphically depicts a change in surface temperature (y-axis) of an inner surface and an outer surface of a glass tube processed in a heating station as a function of holder rotational speed (x-axis) at constant dwell time, according to one or more embodiments shown and described herein.

These certain combinations of part rate and rotational speed of the glass tube 102 in the holder can produce temperature inhomogeneity around the circumference of the glass tube 102. Referring to FIG. 5, the change in surface temperature (y-axis) of an inner surface (ref no. 902) and an outer surface (ref no. 904) of a glass tube 102 processed in a heating station 202 as a function of holder rotational speed (x-axis) at constant dwell time is graphically depicted. For FIG. 5, the heating station 202 has a single burner 302 and the dwell time is equal to the active time during which the burner 302 is engaged with the glass tube 102. The change in surface temperature is the absolute difference between the maximum temperature and the minimum temperature measured on the surface. As shown by the periodic peaks in FIG. 5, certain rotational speeds of the glass tube 102 at a constant dwell time produce substantially greater variability in the surface temperature around the circumference of the glass tube 102 for both the inner surface and the outer surface of the glass tube 102. As discussed previously, this greater temperature variability at these rotational speeds can result in dimensional inhomogeneity in the glass articles produced from the glass tube 102.

Thus, there is a continued need for systems and methods for reducing or preventing temperature and/or dimensional inhomogeneity around the circumference of the glass tube 102 during converting glass tubes 102 to glass articles, in particular, to temperature and dimensional inhomogeneity that may be caused by inconsistent heating or contact with forming tools in the processing stations 106. The systems and methods of the present disclosure reduce or prevent temperature and dimensional inhomogeneity of the preform regions of the glass tube 102 around the circumference of the glass tube 102 during heating, forming, or both by maintaining a combination of active time and rotational speed that results in consistent heating around the circumference of the glass tube 102 in a heating station 202, consistent contact between the glass tube 102 and the forming tools 324 around the circumference of the glass tube 102 in the forming stations 204, or combinations of these. In particular, the systems and methods of the present disclosure are directed to reducing variability in the number of times that each point on an outer surface of the glass tube 102 around the circumference of the glass tube 102 is engaged with a heating element 301 in a heating station 202, in contact with a forming tool 324 in a forming station 204, or both during the active time of the glass tube 102 in a processing station 106.

The average number of times that a point on the outer surface 140 of the glass tube 102 is engaged with a heating element 301 or forming tool 324 in a particular processing station 106 may be characterized by an exposure index. The exposure index may be defined as the rotational speed of the glass tube 102 within the holder 130 multiplied by a number of heating elements 301 or a number of forming tools 324 contacting the outer surface 140 of the glass tube 102 in the processing station 106 and multiplied by the active time of the glass tube 102 in the processing station 106. The exposure index, $I_E$, may be expressed by Equation I (EQU. I).

$$I_E = r \times n \times t_A \qquad \text{EQU. 1}$$

In EQU. 1, r is the rotational speed of the glass tube 102, n is the number of heating elements 301 or number of forming tools 324 contacting the outer surface 140 of the glass tube 102 in the processing station 106, and $t_A$ is the active time of the glass tube 102 in the processing station 106. For a heating station 202 having multiple burners 302, EQU. 1 assumes that all of the multiple burners in the heating station 202 have the same heating rate. For heating stations 202 in which the multiple burners have different heating rates or forming stations 204 in which two or more forming tools are different, a scaling factor accounting for the different heating rates of each burner or different degrees of contact with the forming tools may be included. Alternatively, in embodiments, when a heating station 202 comprises multiple burners with different heating rates or a forming station 204 includes two or more different types of forming tools, the n may be set to a value of 1 in EQU. 1. As previously discussed, the active time $t_A$ may be the total duration of time the glass tube 102 is maintained in engagement with at least one heating element 301 or at least one forming tool 324 while in the processing station 106. For an indexing converter the active time may be less than or equal to the dwell time of the converter 100.

The exposure index may be indicative of an average number of times that each point on a circumference of the glass tube 102 at a Z position (e.g., position along the +/−Z axis FIG. 4) is exposed to a heating element 301 or forming tool 324 while in the processing station 106. An exposure of a point on the circumference of the glass tube 102 to a heating element 301 may refer to the point on the circumference of the glass tube 102 rotating into engagement with the heating element so that the heating element heats that point of the glass tube 102. Rotation of the glass tube 102 in the processing station 106 will rotate each of the points on the circumference into engagement with the heating element 301 in continuous succession. Likewise, for a forming station 204, an exposure of a point on the circumference of the glass tube 102 to a forming tool 324 may refer to the point on the circumference of the glass tube 102 rotating into contact with the forming tool 324 so that the forming tool 324 deforms the glass at that point on the circumference of the glass tube 102.

It has been discovered that maintaining the exposure index as close as possible to an integer can reduce or prevent temperature and/or dimensional inhomogeneity in the glass tube 102 around the circumference of the glass tube 102 during converting. The converter 100 may have an exposure index such that an absolute difference between the exposure index and the nearest integer is less than or equal to 0.30, such as less than or equal to 0.25, less than or equal to 0.20, less than or equal to 0.15, less than or equal to 0.10, or even less than or equal to 0.05. Not intending to be bound by any particular theory, it is believed that when the exposure index is within 0.3 of the nearest integer, enough of the points on the circumference of the glass tube 102 have the same number of exposures to a heating element or forming tool in the processing station 106 to reduce or prevent wobble and reduce temperature and/or dimensional inhomogeneity around the circumference of the glass tube 102 resulting therefrom. Each exposure to the heating element 301 adds heat to the glass tube 102, thereby increasing the temperature of the glass. As the exposure index approaches an integer, a greater proportion of points along the circumference of the glass tube 102 may receive the same number of exposures to the heating element 301, which may result in the greater proportion of points around the circumference of the glass tube 102 receiving the same amount of heat during the active time. Thus, the heating may be more even around the circumference of the glass tube 102 when the exposure index is within 0.30 of the nearest integer, resulting in greater temperature and dimensional homogeneity. In other words, all the periphery of the glass tube 102 receives substantially the same heat from the steady burners when the exposure index is close to an integer. In the case of forming tools 324, contact with the forming tools 324 removes heat from the glass tube 102. Thus, in a forming station 204, maintaining the exposure index closer to an integer value may ensure that substantially the same heat is removed by the forming tools 324 for most of the points around the circumference of the glass tube 102.

When the exposure index of the converter 100 is within 0.30 of the nearest integer, greater than or equal to 70% of the points of the glass around the circumference have the same number of exposures to a heating element or forming tool in the processing station 106. When the exposure index of the converter 100 is within 0.25 of the nearest integer, greater than or equal to 75% of the points of the glass around the circumference have the same number of exposures to a heating element or forming tool in the processing station 106. When the exposure index of the converter 100 is within 0.20 of the nearest integer, greater than or equal to 80% of the points of the glass around the circumference have the same number of exposures to a heating element or forming tool in the processing station 106. When the exposure index of the converter 100 is within 0.10 of the nearest integer, greater than or equal to 90% of the points of the glass around the circumference have the same number of exposures to a heating element or forming tool in the processing station 106. When the exposure index of the converter 100 is equal to an integer, then, theoretically, 100% of the points of the glass around the circumference have the same number of exposures to a heating element or forming tool in the processing station 106. Thus, the closer the exposure index is to the nearest integer the more consistent the heating or forming is around the circumference of the glass tube 102.

Figure 6A:
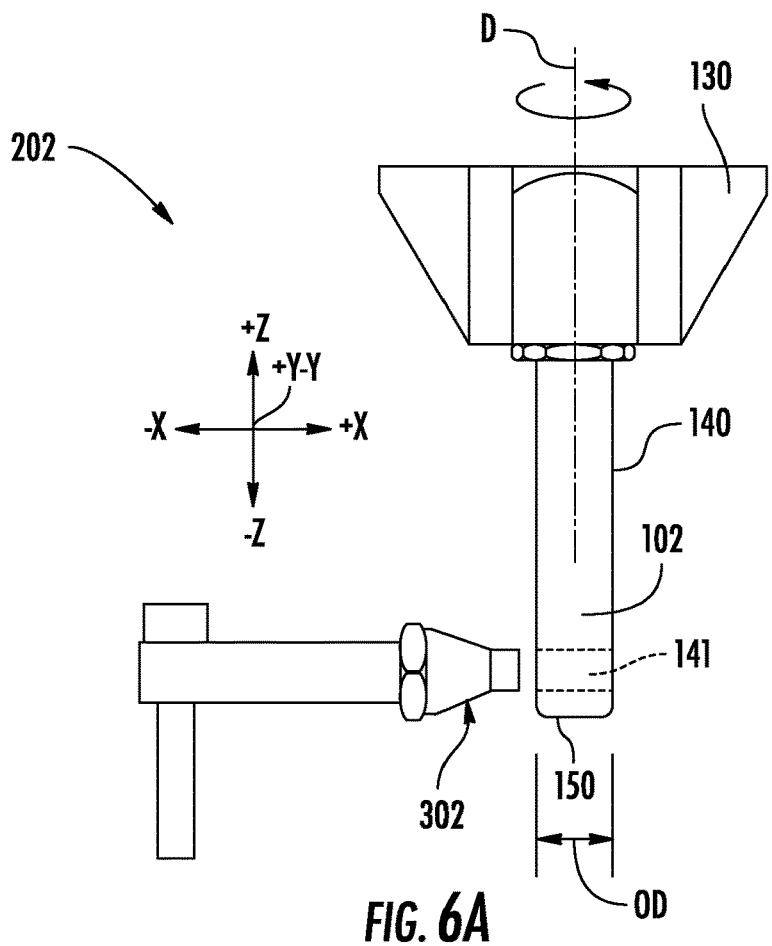
FIG. 6A schematically depicts another front view of a heating station of the converter of FIG. 1, according to one or more embodiments shown and described herein.
Figure 6B:
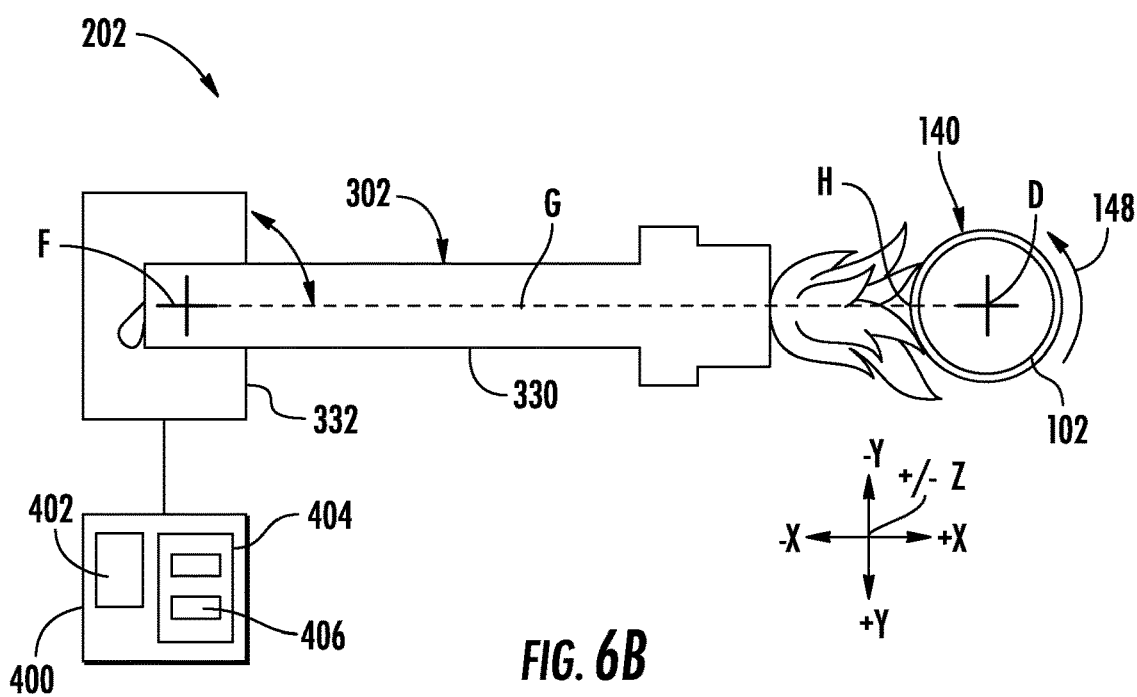
FIG. 6B schematically depicts a top view of the heating station of FIG. 6A, according to one or more embodiments shown and described herein.
Figure 7:
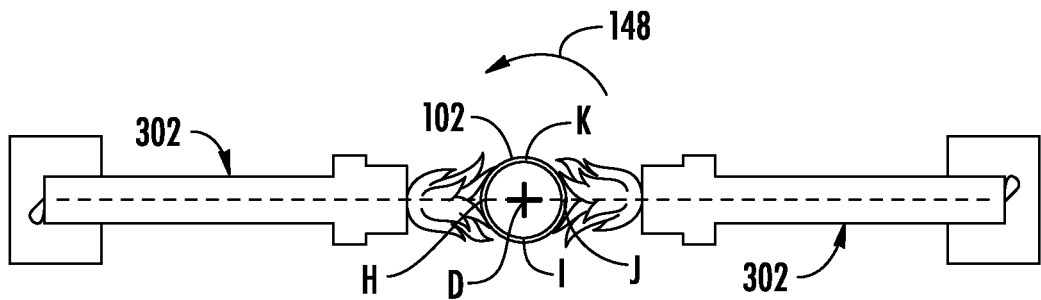
FIG. 7 schematically depicts a top view of another heating station of the converter of FIG. 1 having two heating elements, according to one or more embodiments shown and described herein.

Referring now to FIGS. 6A and 6B, a heating station 202 having a single heating element 301 is schematically depicted in front view and top view, respectively. When the heating station 202 has a single heating element 501, the number of heating elements in EQU. 1 is equal to one. For a single heating element 501 in a heating station 202, the exposure index is equal to the rotational speed (rotations per time) of the glass tube 102 about center axis D times the active time of the glass tube 102 in engagement with the heating element 301. Thus, the exposure index for a heating station 202 with a single heating element 301 is equal to a number of rotations of the glass tube 102 during the active time, or revolutions per active time. For each full complete revolution of the glass tube 102 during the active time in the heating station 202, each of the points around the circumference of the glass tube 102 in the preform region 141 may pass into direct engagement with the heating element 301 one time, such as by passing into alignment with line G at point H in FIG. 6B.

However, if the combination of active time and rotational speed of the glass tube 102 results in an additional partial revolution of the glass tube 102 at the end of the active time, then a first portion of the circumference of the glass tube 102 will receive an additional exposure to the heating element 301. The first portion of the circumference of the glass tube 102 that receives the additional exposure to the heating element 301 may have a greater temperature compared to a second portion of the circumference of the glass tube 102 that does not receive the additional exposure. Thus, a temperature inhomogeneity around the circumference of the glass tube 102 may result, which can lead to wobble and/or dimensional inhomogeneity in the finished glass articles made from the glass tube 102. The temperature and/or dimensional inhomogeneity may be the greatest at one-half of a revolution, in which case the first portion receiving the additional exposure and the second portion that does not receive additional exposure are equal. The temperature and/or dimensional inhomogeneity has been found to be reduced when the revolutions per active time is within 0.30 or 0.25 of the nearest integer.

Figure 8:
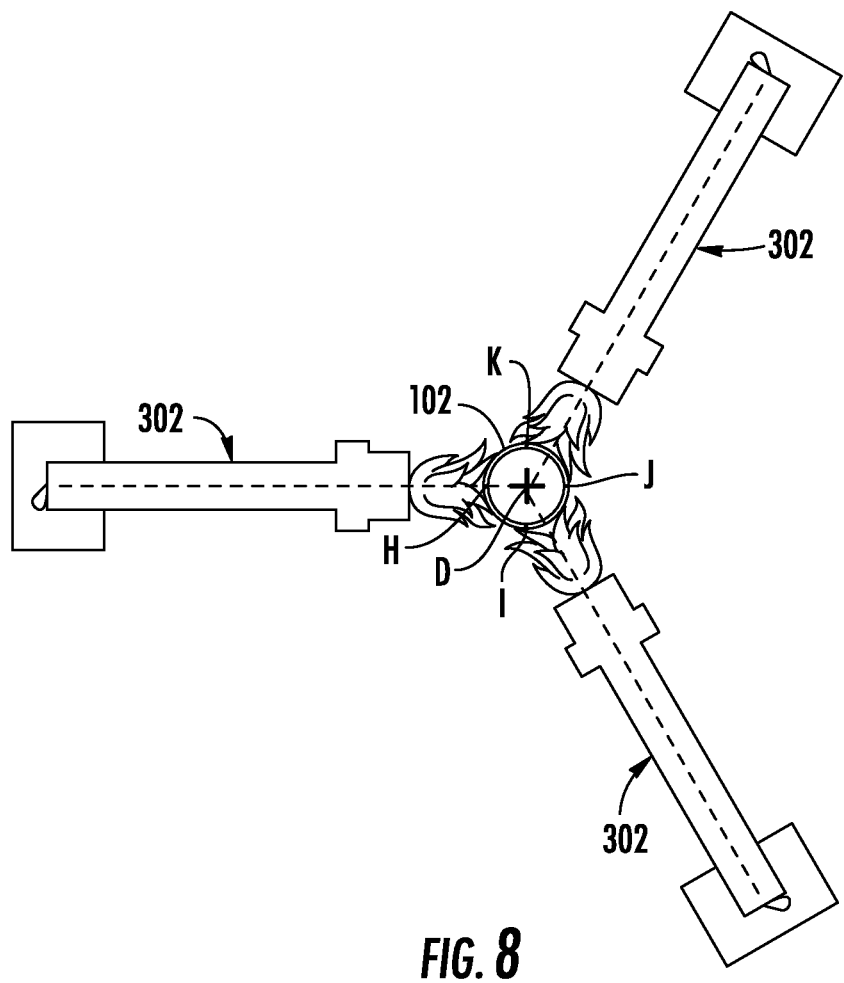
FIG. 8 schematically depicts a top view of still another heating station of the converter of FIG. 1 having three heating elements, according to one or more embodiments shown and described herein.

Referring now to FIGS. 7 and 8, in embodiments, a heating station 202 of the converter 100 may have a plurality of heating elements 301, such as a plurality of burners 302. Referring to FIG. 7, a heating station 202 having two burners 302 radially spaced apart 180 degrees from each other is schematically depicted. In the case of two burners 302, each complete revolution of the glass tube 102 in the heating station 202 may cause each point on the outer surface 140 of the glass tube 102 to receive two exposures to a burner 302. Thus, the exposure index for a heating station 202 having two burners 302 may be equal to 2 (number of burners 302) multiplied by the rotational speed of the glass tube 102 about center axis D multiplied by the active time of the glass tube 102 in the heating station 202. For an exposure index equal to an integer, a point on the outer surface 140 of the glass tube 102 starting at point H will end up at point H or point J in FIG. 7 at the end of the active time. This has been found to result in very little temperature and/or dimensional inhomogeneity around the circumference of the glass tube 102. When the exposure index is halfway between two integers, the point on the outer surface 140 of the glass tube 102 starting at point H will end up at either of point I or point K in FIG. 7 at the end of the active time. Under these conditions, at point I or point K, the quarter portions of the glass tube 102 downstream of points I and K relative to the direction of rotation 148, will have received an extra exposure to one of the burners 302 while the quarter portions of the glass tube upstream of points I and K will not have received the extra exposure. Thus, temperature and/or dimensional inhomogeneity may be greatest when the exposure index is halfway between two integers. The temperature and/or dimensional inhomogeneity may be decreased by adjusting the exposure index so that the absolute difference between the exposure index and the nearest integer is less than 0.30, less than or equal to 0.25, less than or equal to 0.20, less than or equal to 0.15, less than or equal to 0.10, or even less than or equal to 0.05.

Referring now to FIG. 8, a heating station 202 having three burners 302 evenly spaced apart radially from one another is schematically depicted. In the case of three burners 302, each complete revolution of the glass tube 102 in the heating station 202 may cause each point on the outer surface 140 of the glass tube 102 to receive three exposures to a burner 302. Thus, n is equal to 3 in EQU. 1, and the exposure index for a heating station 202 having three burners 302 may be equal to 3 multiplied by the rotational speed of the glass tube 102 about center axis D multiplied by the active time of the glass tube in the heating station 202. More than three burners 302 in a heating station 202 is contemplated.

Temperature and/or dimensional inhomogeneity around the circumference of the glass tube 102 may be reduced or decreased by adjusting the exposure index so that the absolute difference between the exposure index and the nearest integer is less than 0.30, less than or equal to 0.25, less than or equal to 0.20, less than or equal to 0.15, less than or equal to 0.10, or even less than or equal to 0.05. As previously discussed, the exposure index may be modified by changing the rotational speed of the glass tube 102 in the holder 130 or by adjusting the active time of the glass tube 102 in the processing station 106. For heating stations 202, the active time of the glass tube 102 may be modified by changing the dwell time of the converter 100 or by moving the heating elements 301 (e.g., burners 302) into and out of engagement with the glass tube 102 during the dwell time. The heating elements 301 may be moved into and out of engagement with the glass tube 102 by pivoting the heating element 301 towards and away from the glass tube 102, translating the heating element 301 closer or farther from the glass tube 102, or both. Other methods of moving the heating elements 301 into or out of engagement with the glass tube 102 are also contemplated.

Referring again to FIG. 6B, in embodiments, the burner 302 in the heating station 202 may be a swivel burner 330 operable to pivot laterally (e.g., in the X-Y plane according to the coordinate axis in FIG. 6) about vertical axis F into and out of engagement with the glass tube 102. The swivel burner 330 may include a swivel burner actuator 332 operatively coupled to the swivel burner 330. The swivel burner actuator 332 may pivot the swivel burner 330 about the axis F to move the flame of the swivel burner 330 into and out of engagement with the glass tube 102. In FIG. 6B, the swivel burner 330 is depicted in a position in which the flame of the swivel burner 330 is in engagement with the glass tube 102 to heat the glass tube 102. In a position of engagement with the glass tube 102, the flame of the swivel burner 330 may contact or point towards the glass tube 102. In embodiments, in a position of engagement with the glass tube 102, the swivel burner 330 and flame may be aligned along a line G extending through the axis D of rotation of the glass tube 102. In a position out of engagement with the glass tube 102, the flame of the swivel burner 330 may point away from the glass tube 102 so that the flame does not touch or point directly towards the glass tube 102. In embodiments, when out of engagement, the swivel burner 330 may be oriented so that it does not align with the line G that intersects the axis D of rotation of the glass tube 102. The burners 302 may also be operatively coupled to actuators that move the burner 302 towards or away from the glass tube 102 in the X-Y plane of FIG. 6B or vertically in the +/−Z direction of FIG. 6A to move the burner 302 into and out of engagement with the glass tube 102. Other methods of changing the active time are contemplated.

Figure 9A:
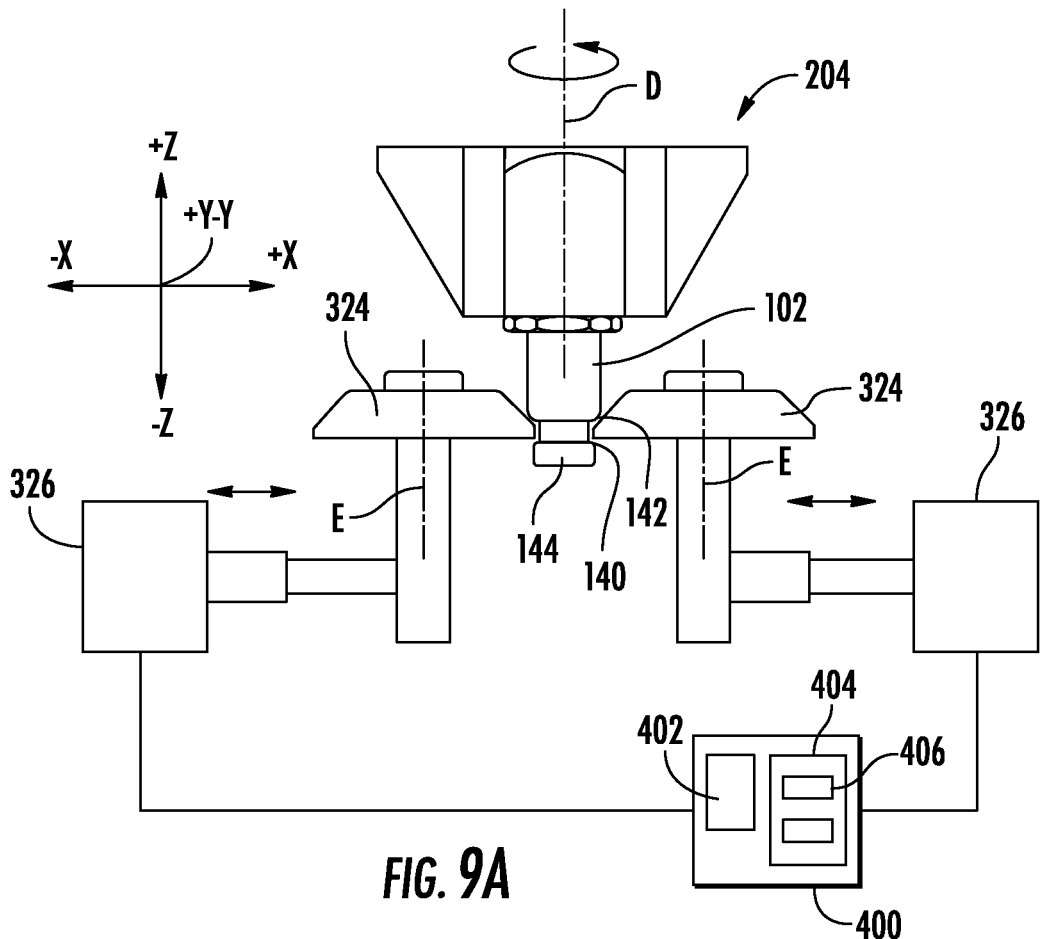
FIG. 9A schematically depicts a front view of a forming station of the converter of FIG. 1, according to one or more embodiments shown and described herein.
Figure 9B:
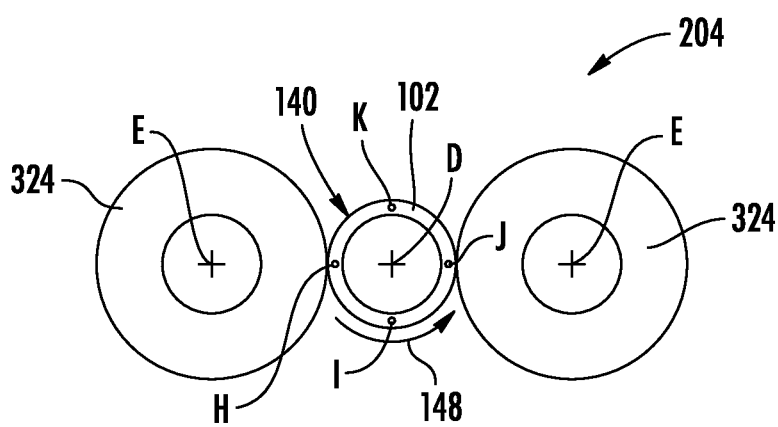
FIG. 9B schematically depicts a top view of the forming station of the converter of FIG. 9A, according to one or more embodiments shown and described herein.

Referring now to FIGS. 9A and 9B, a forming station 204 having two forming tools 324 in contact with the outer surface 140 of the glass tube 102 is schematically depicted. In contrast to heating elements 301, such as the burners 302 in FIGS. 7 and 8, contact between the forming tools 324 and the glass tube 102 may operate to reduce the temperature of the glass tube 102. The glass tube 102 entering the forming station 204 may have a greater temperature at the outer surface 140 compared to the surface temperature of the forming tools 324, which may cause heat to transfer from the glass tube 102 to the forming tools 324 through contact between the forming tools 324 and the glass tube 102. Temperature inhomogeneity around the circumference of the glass tube 102 may result when some portions of the circumference of the glass tube 102 have a greater number of exposures to the forming tools 324 compared to other portions of the circumference of the glass tube 102.

Dimensional inhomogeneity around the circumference of the glass tube 102 may be caused by temperature inhomogeneity around the circumference of the glass tube 102 or by differences in glass displacement between points on the circumference of the glass tube 102 resulting from differences in the number of exposures to the forming tools 324. As previously discussed, contact with the forming tools 324 causes displacement of the glass of the glass tube 102 in the preform region in order to form one or more features of the finished glass articles. Each exposure of a point on the circumference of the glass tube 102 to a forming tool 324 causes some displacement of the glass at that point. Thus, dimensional inhomogeneity around the circumference of the glass tube 102 may result when some portions of the circumference of the glass tube 102 have a greater number of exposures to the forming tools 324 and greater glass displacement compared to other portions of the circumference of the glass tube 102.

As with heating stations 302, temperature and/or dimensional inhomogeneity around the circumference of the glass tube 102 may be reduced in forming stations 204 by maintaining the exposure index of the glass tube 102 in the forming station 324 as close as possible to an integer. The forming station 204 may have an exposure index such that an absolute difference between the exposure index and the nearest integer is less than or equal to 0.30, such as less than or equal to 0.25, less than or equal to 0.20, less than or equal to 0.15, less than or equal to 0.10, or even less than or equal to 0.05.

Referring to FIG. 9B, a forming station 204 having two forming tools 324 contacting the outer surface 140 of the glass tube 102 is schematically depicted. The two forming tools 324 may be radially spaced apart 180 degrees from each other. In the case of two forming tools 324, each complete revolution of the glass tube 102 in the forming station 204 may cause each point on the outer surface 140 of the glass tube 102 to receive two exposures to a forming tool 324. Thus, the exposure index for a forming station 204 having two forming tools 324 contacting the outer surface 140 of the glass tube 102 may be equal to 2 multiplied by the rotational speed of the glass tube 102 about center axis D multiplied by the active time of the glass tube 102 in the forming station 204. For an exposure index equal to an integer, a point on the outer surface 140 of the glass tube 102 starting at point H will end up at point H or point J in FIG. 9B at the end of the active time. This has been found to result in very little temperature and/or dimensional inhomogeneity around the circumference of the glass tube 102. When the exposure index is halfway between two integers, the point on the outer surface 140 of the glass tube 102 starting at point H will end up at either of point I or point K in FIG. 9B at the end of the active time. Under these conditions, at point I or point K, the quarter portions of the glass tube 102 downstream of points I and K relative to the direction of rotation 148, will have received an extra exposure to one of the forming tools 324 while the quarter portions of the glass tube upstream of points I and K will not have received the extra exposure. Thus, temperature and/or dimensional inhomogeneity may be greatest when the exposure index is halfway between two integers. In embodiments, the forming station 324 may include a third forming tool inserted inside the glass tube 102 (e.g., forming tool 324c in FIG. 3C). In the case where the forming station 204 includes two forming tools 324 contacting the outer surface 140 of the glass tube 102 and a third forming tool inserted into the interior of the glass tube 102, the exposure index is still equal to 2 multiplied by the rotational speed of the glass tube 102 about center axis D multiplied by the active time of the glass tube 102 in the forming station 204.

The temperature and/or dimensional inhomogeneity around the circumference of the glass tube 102 may be decreased by adjusting the exposure index so that the absolute difference between the exposure index and the nearest integer is less than 0.30, less than or equal to 0.25, less than or equal to 0.20, less than or equal to 0.15, less than or equal to 0.10, or even less than or equal to 0.05. The exposure index in a forming station 204 may be modified by changing the rotational speed of the glass tube 102 about center axis D or by changing the active time in which the forming tools 324 are engaged and/or in contact with the outer surface 140 of the glass tube 102. The active time may be modified by moving the forming tools 324 into and out of contact with the glass tube 102 to change the active time.

Referring to FIG. 9A, in embodiments, each of the forming tools 324 may be operatively coupled to a forming tool actuator 326. The forming tool actuators 326 may be operable to move the forming tools 324 into and out of engagement with the glass tube 102. The timing of actuating the forming tools 324 into and out of engagement with the glass tube 102 may be adjusted to modify the active time of the glass tube 102 in contact with the forming tools 324.

Although shown in FIGS. 9A and 9B as having 2 forming tools 324, it is understood that a forming station can have more than 2 forming tools, such as 3, 4 or more than 4 forming tools. For each case, the exposure index may be equal to the number of forming tools 324 contacting the outer surface 140 of the glass tube 102 multiplied by the rotational speed of the glass tube 102 multiplied by the active time.

Referring again to FIG. 1, a system for producing a plurality of glass articles from glass tube 102 may include the converter 100 having a plurality of processing stations 106 comprising at least one heating station 202, at least one forming station 204, and a separating station 206. The converter 100 may be operable to move or pass the glass tube 102 through each of the plurality of processing stations 106. The converter 100 may include the plurality of holders 130. Each of the plurality of holders 130 may be operable to secure a glass tube 102 and rotate the glass tube 102 about the center axis D of the glass tube 102. It is understood and intended that the converter 100 may include any of the features, processing stations, or operating parameters described herein for converter 100. Each of the plurality of processing stations 106 may have an exposure index defined as the rotational speed of the glass tube 102 within the holder 130 in units of rotations per time multiplied by the number of heating elements 301 or a number of forming tools 324 contacting the outer surface 140 of the glass tube 102 in the processing station 106 multiplied by the active time of the glass tube 102 in the processing station 106. One or more of the processing stations 106, such as the heating stations 202, the forming stations 204, separation station 206, or combinations of these may have an absolute difference between the exposure index and the nearest integer of less than or equal to 0.30, less than or equal to 0.25, less than or equal to 0.20, less than or equal to 0.10, or less than or equal to 0.05.

In any of the systems disclosed herein, the converter 100 may be an index converter operable to index the glass tube 102 through each of the plurality of processing stations 106. In embodiments, the active time in one or more processing stations 106 may be less than or equal to a dwell time of the converter 100. In any of the systems disclosed herein, the converter 100 may be a continuous converter operable to continuously translate the glass tube 102 through the plurality of processing stations 106. In embodiments, the converter 100 may be operable to change the rotational speed of the glass tube 102 in the holder 130 to change the active time of the glass tube 102 in the processing stations 106.

Referring again to FIGS. 5A and 5B, in any of the systems disclosed herein, at least one heating station 202 of the converter 100 may include at least one swivel burner 330 operatively coupled to a swivel burner actuator 332. The swivel burner actuator 332 may be operable to pivot the swivel burner 302 into and out of engagement with the glass tube 102 in the heating station 202 to change the active time of the glass tube 102 in engagement with the swivel burner 330. Additionally or alternatively, in embodiments, the systems disclosed herein may include a heating station 202 having a burner translation system operable to translate at least one burner 302 horizontally or vertically into or out of engagement with the glass tube 102 to change the active time of the glass tube 102 in the heating station 202. Each heating station 202 of the converter 100 may include 1, 2, 3, 4, or more than 4 heating elements 301, such as burners 302, swivel burners 330, and the like.

The heating stations 202 are described herein in the context of burners 302 used to heat the glass tube 102. However, it is understood that other heating elements may also be used to heat the glass tube. Other heating elements may include, but are not limited to, lasers such as CO2 lasers for example, induction heaters, other heating devices, or combinations of these. A laser heating element may be turned off and on to engage or disengage the heating element with the glass tube 102.

Referring again to FIGS. 9A and 9B, in any of the systems disclosed herein, at least one forming station 204 may include one or a plurality of forming tools 324. One or more of the forming tools 324 may be operatively coupled to a forming tool actuator 326. The forming tool actuators 326 may be operable to translate the forming tools 324 into and out of engagement with the glass tube 102 to change the active time of the glass tube 102 in the forming station 204. In embodiments, the forming tools 324 may be positioned to contact the outer surface 140 of the glass tube 102. In embodiments, the forming station 204 may include a central forming tool 324c that may be inserted into the interior of the glass tube 102 during the active time in the forming station 204.

Any of the systems disclosed herein may additionally include a measuring system that may be operable to measure at least a temperature of the glass tube, at least a dimension of the glass tube, or combinations of these around the circumference of the glass tube 102. The measuring system may be a thermal imaging system, such as the thermal imaging systems disclosed in U.S. patent application Ser. No. 15/928,837, entitled "SYSTEMS AND METHODS FOR MEASURING THE TEMPERATURE OF GLASS DURING TUBE CONVERSION," filed on Mar. 22, 2018, the entire contents of which are incorporated by references herein in their entirety. The thermal imaging systems may be operable to measure one or more temperatures around the circumference of the glass tube. The measuring system may additionally include a dimension measuring system, such as one or more of a visual imaging system, a laser reflectometer, a laser gauge, an optical micrometer, or other measuring device operable to measure one or more dimensions of the glass tube 102 around the circumference of the glass tube 102. Other available measuring systems for determining one or more temperatures, dimensions, or both of the glass tube 102 around the circumference of the glass tube 102 are contemplated. The measuring system may be positioned at the one or more heating stations 202, the one or more forming station 204, a measuring station 218 downstream of the forming stations 204, or combinations of these. In embodiments, the measuring system may be positioned at or just after the heating station 202, the forming station 204, or both to directly measure the temperature and/or dimensional inhomogeneity around the circumference of the glass tube 102 resulting from the heating station 202 or forming station 204, respectively.

Referring again to FIG. 1, the system for producing a plurality of glass articles from glass tube 102 may further include a system controller 400 that may be communicatively coupled to the converter 100. The system controller 400 may include at least one processor 402 and at least one storage medium 404 containing computer readable and executable instructions 406. The computer readable and executable instructions 406, when executed by the processor 402, may cause the system to automatically identify one or more temperature or dimensional inhomogeneity in the glass tube 102 around a circumference of the glass tube 102 and determine an exposure index of the glass tube 102 for one or more of the plurality of processing stations 106. As previously discussed, the exposure index for the glass tube 102 in a particular processing station 106 may be equal to the rotational speed of the glass tube 102 within the holder 130 in units of rotations per time multiplied by a number of heating elements 301 or a number of forming tools 324 in contact with the outer surface 140 of the glass tube 102 in the processing station 106 and multiplied by the active time of the glass tube 102 in the processing station 106. The computer readable and executable instructions 406, when executed by the processor 402, may cause the system to automatically compare the exposure index for one or more of the processing stations 106 to the nearest integer and adjust the rotational speed of the glass tube 102, an active time of the glass tube 102 in the processing stations 106, or both to maintain an absolute difference between the exposure index and the nearest integer less than or equal to 0.30, less than or equal to 0.25, less than or equal to 0.20, less than or equal to 0.10, or even less than or equal to 0.05.

In embodiments, the computer readable and executable instructions 406, when executed by the processor 402, may cause the system to automatically receive or obtain the rotational speed of the glass tube 102 from the converter 100, and multiply the rotational speed of the glass tube 102 by a number of heating elements 301 or a number of forming tools 324 in contact with the outer surface 140 of the glass tube 102 and by the active time of the glass tube 102 in the processing station 106 to determine the exposure index of a processing station 106. The system controller 400 may receive the number of forming tools 324 or heating elements 301 in the processing station 106 from the converter 100 or may retrieve this information from the at least one storage medium. The system controller 400 may also receive the active time from the converter 100 or retrieve the active time from the at least one storage medium.

In embodiments, the computer readable and executable instructions 406, when executed by the processor 402, may cause the system to automatically adjust the rotational speed of the glass tube 102 to adjust the exposure index for one or a plurality of the processing stations 106. Alternatively or additionally, in embodiments, the computer readable and executable instructions 406, when executed by the processor 402, may cause the system to automatically adjust the active time in one or more processing stations 106 to adjust the exposure index. In embodiments, the converter 100 may be an indexing converter operable to index the glass tube 102 through each of the plurality of processing stations 106, and the computer readable and executable instructions 406, when executed by the processor 402, may cause the system to automatically increase or decrease the dwell time of the converter 100 to increase or decrease the active time of the glass tube 102 in the plurality of processing stations 106.

In embodiments, the computer readable and executable instructions 406, when executed by the processor 402, may cause the system to automatically modify an active time in one or more processing stations without changing the dwell time of the converter 100. Referring again to FIGS. 6A and 6B, system may be operable to change the active time in a heating station 202 by adjusting the timing of moving the heating elements 301 or burners 302 into and out of engagement with the glass tube 102.

In embodiments, the converter 100 may include the at least one heating station 202 having at least one swivel burner 330 operatively coupled to a swivel burner actuator 332, where the swivel burner actuator 332 may be operable to pivot the swivel burner 330 into and out of engagement with the glass tube 102. The swivel burner actuator 332 may be communicatively coupled to the system controller 400, such as being in electrical communication with the system controller 400. The swivel burner actuator 332 may be operable to receive control signals form the system controller 400, where the control signals may cause the swivel burner actuator 332 to pivot the swivel burner 330 into or out of engagement with the glass tube 102. The computer readable and executable instructions 406, when executed by the processor 402, may cause the system to automatically change the timing of pivoting the swivel burner 330 into and out of engagement with the glass tube 102 to change the active time of the glass tube 102 in the heating station 202. The computer readable and executable instructions 406, when executed by the processor 402, may cause the system to automatically send a control signal to the swivel burner actuator 332 indicative of a timing for pivoting the swivel burner 330 into and out of engagement with the glass tube 102. The computer readable and executable instructions 406, when executed by the processor 402, may cause the system to automatically send a first control signal to the swivel burner 330 or swivel burner actuator 332 at time T1 to cause the swivel burner 330 or swivel burner actuator 332 to transition the swivel burner 330 into engagement with the glass tube 102. At the conclusion of the active at time T2, the system controller 400 may send a second control signal to the swivel burner 330 or the swivel burner actuator 332 indicative of a command to transition the swivel burner 330 to a position out of engagement with the glass tube 102. The system may be operable to change the duration of time between T1 and T2 to change the active time.

Although shown in FIGS. 6A and 6B as including a swivel burner 330 that pivots about the axis F to move the flame into and out of engagement with the glass tube 102, it is understood that other mechanisms for moving the burner 302 into and out of engagement with the glass tube 102 are contemplated. In embodiments, the heating station 202 may include a translation system (not shown) operable to translate the burner 302 in a linear direction into and out of engagement with the glass tube 102. The translation system may move the burner 302 laterally (i.e., in the X-Y plane of FIGS. 6A and 6B) or vertically (i.e., in the +/−Z direction of the coordinate axis of FIG. 6A) into and out of engagement with the glass tube 102. The translation system may be communicatively coupled to the system controller 400 to receive control signals from the system controller 400. The computer readable and executable instructions 406, when executed by the processor 402, may cause the system to automatically send one or more control signals to the burner translation system indicative of commands for translating the burner 302 into and out of engagement with the glass tube 102. The computer readable and executable instructions 406, when executed by the processor 402, may cause the system to automatically adjust a timing of the control signals to the translation system to change the active time of the glass tube 102 in engagement with the burner 302 in the heating station 202.

Referring again to FIGS. 9A and 9B, in embodiments, the converter 100 may include the at least one forming station 204 having at least one forming tool 324 operatively coupled to a forming tool actuator 326, where the forming tool actuator 326 may be operable to translate the forming tool 324 into and out of engagement with the glass tube 102. The forming tool actuator 326 may be communicatively coupled to the system controller 400, such as being in electrical communication with the system controller 400. Each forming tool actuator 326 may be operable to receive control signals form the system controller 400, where the control signals may cause the forming tool actuators 326 to translate the forming tools 324 into or out of engagement with the glass tube 102. The computer readable and executable instructions 406, when executed by the processor 402, may cause the system to automatically change the timing of translating the forming tools 324 into and out of engagement with the glass tube 102 to change the active time of the glass tube 102 in the forming station 204. The computer readable and executable instructions 406, when executed by the processor 402, may cause the system to automatically send a control signal to the forming tool actuator 326 indicative of a timing for translating the forming tools 324 into and out of engagement with the glass tube 102. The computer readable and executable instructions 406, when executed by the processor 402, may cause the system to automatically send a first control signal to the forming tool actuator 326 at time T1 to cause the forming tool actuator 326 to translate the forming tool 324 into engagement with the glass tube 102. At the conclusion of the active at time T2, the system controller 400 may send a second control signal to the forming tool actuator 326 indicative of a command to translate the forming tool 324 to a position out of engagement with the glass tube 102. In embodiments, the at least one forming station 204 may include a plurality of forming tools 324 and a plurality of forming tool actuators 326, each forming tool actuator 326 being communicatively coupled to the system controller 400 and operable to receive control signals from the system controller 400.

In embodiments, any of the systems disclosed herein may include the measuring system (not shown), which may be communicatively coupled to the system controller 400. The computer readable and executable instructions 406, when executed by the processor 402, may cause the system to automatically receive one or more signals or data from the measuring system indicative of one or more properties of the glass tube 102. The properties of the glass tube 102 may be one or more temperatures, one or more dimensions, or both around a circumference of the glass tube 102. The computer readable and executable instructions 406, when executed by the processor 402, may cause the system to automatically determine a variability of the temperature, dimensions, or both around a circumference of the glass tube 102 based on the signal from the measuring system and adjust the active time, the rotational speed of the glass tube 102 about center axis D, or both in the processing station 106 to modify the exposure index in response to the variability of the temperature, dimensions, or both.

Referring again to FIGS. 1 and 2, methods disclosed herein for producing a plurality of glass articles from glass tube 102 may include securing the glass tube 102 in one of the plurality of holders 130 of the converter 100, where the converter 100 may include a plurality of processing stations 106. The plurality of processing stations 106 may include at least one heating station 202, at least one forming station 204, at least one separating station 206, or combinations of these. It is understood and intended that in any of the methods disclosed herein, the converter 100 may include any of the features, processing stations, or operating parameters described herein for converter 100. The methods may further include rotating the glass tube 102 about the center axis D of the glass tube 102 in the holder 130 and passing the glass tube 102 through each of the plurality of processing stations 106 to form one or more features at a working end of the glass tube 102. For each processing station 106, an active time of the processing station 106 may be the amount of time the glass tube 102 is maintained in engagement with at least one heating element 301 or at least one forming tool 324 while in the processing station 106. An exposure index for each of the processing stations 106 may be equal to the rotational speed of the glass tube 102 within the holder 130 in units of rotations per time multiplied by a number of heating elements 301 or a number of forming tools 324 in the processing station 106 and multiplied by the active time of the glass tube 102 in the processing station 106. The methods may include operating the converter 100 so that the absolute difference between the exposure index and the nearest integer may be less than or equal to 0.30, less than or equal to 0.25, less than or equal to 0.20, less than or equal to 0.10, or even less than or equal to 0.05.

Any of the methods disclosed herein may further include identifying a temperature or dimensional inhomogeneity in the glass tube 102 around a circumference of the glass tube 102, determining the exposure index for the glass tube 102 in one or more of the plurality of processing stations 106, comparing the exposure index to the nearest integer, and adjusting the rotational speed of the glass tube 102, the active time of the glass tube 102 in the processing station 106, or both to maintain the absolute difference between the exposure index and the nearest integer less than or equal to 0.30, less than or equal to 0.25, less than or equal to 0.20, less than or equal to 0.10, or less than or equal to 0.05. Identifying a temperature or dimensional inhomogeneity may include measuring at least one temperature, at least one dimension, or both around a circumference of the glass tube 102 and determining a variability in the temperature or dimensions around a circumference of the glass tube 102 based on the measurement.

Any of the methods disclosed herein may include maintaining the exposure index in one or more processing stations 106 within +/−0.30 of the nearest integer, within +/−0.25 of the nearest integer, within +/−0.20 of the nearest integer, within +/−0.15 of the nearest integer, or within +/−0.10 of the nearest integer, wherein maintaining the exposure index within +/−0.30, +/−0.25, +/−0.20, +/−0.15, or +/−0.10 of the nearest integer may reduce instability in rotation of the glass tube 102, variations in temperature circumferentially around the glass tube 102, variations in dimensions circumferentially around the glass tube 102, or combinations of these. In embodiments, the exposure index may be equal to an integer.

In any of the methods disclosed herein, the converter 100 may include a plurality of holders 130 and the methods disclosed herein may include securing one of a plurality of the glass tubes 102 in each of the plurality of holders 130 and passing each of the plurality of holders 130 and the glass tubes 102 disposed therein through the plurality of processing stations 106. In embodiments, any of the methods disclosed herein may include maintaining the active time constant for each of the plurality of glass tubes 102 in each of the plurality of processing stations 106 and adjusting the rotational speed of each of the plurality of glass tubes 102 to maintain the absolute difference between the exposure index and the nearest integer less than or equal to 0.30, less than or equal to 0.25, less than or equal to 0.20, less than or equal to 0.10, or less than or equal to 0.05 for each of the plurality of glass tubes 102 in each of the plurality of processing stations 106 to reduce temperature and dimensional inhomogeneity in the glass tube 102 around a circumference of the glass tube 102.

Any of the methods disclosed herein may include adjusting an active time of the each of the plurality of glass tubes 102 in the processing stations 106 to maintain the absolute difference between the exposure index and the nearest integer less than or equal to 0.30, less than or equal to 0.25, less than or equal to 0.20, less than or equal to 0.10, or less than or equal to 0.05. Adjusting the active time may include increasing or decreasing the dwell time of the converter, changing the timing of moving or actuating the heating elements 301, forming tools 324, or both into or out of engagement with the glass tube 102, or combinations of these.

Referring to FIGS. 6A and 6B, in embodiments of any of the methods disclosed herein, one of the processing stations 106 may be a heating station 202 comprising a swivel burner 330 and the methods may include pivoting the swivel burner 330 into and out of engagement with the glass tube 102 in the heating station 202. The methods may include modifying the active time of the glass tube 102 in engagement with the swivel burner 330 by changing the timing of pivoting the swivel burner 330 into or out of engagement with the glass tube 102, thereby modifying the exposure index. In embodiments, the heating station 202 may include a translation system or burner actuator that may translate the burner 302 in a linear manner into or out of engagement with the glass tube 102 instead of pivoting the burner 302.

Referring now to FIGS. 9A and 9B, in embodiments of any of the methods disclosed herein, one of the processing stations 106 may be a forming station 204 comprising one or a plurality of forming tools 324 operatively coupled to one or more tool actuators 326 and the methods may include actuating the forming tools 324 into and out of engagement/contact with the glass tube 102 in the forming station 204. The methods may include modifying the active time of the glass tube 102 in engagement or contact with the forming tools 324 by changing the timing of actuating the forming tools 324 into or out of engagement with the glass tube 102, thereby modifying the exposure index.

In any of the methods disclosed herein, each of the plurality of processing stations 106 of the converter 100 may be in a fixed position and the methods may include indexing the glass tube 102 through each of the processing stations 106 sequentially in succession. Alternatively, in embodiments, in any of the methods disclosed herein, the converter 100 may be a continuous converter, and the methods may include passing the glass tube continuously through the plurality of processing stations, where each of the plurality of processing stations may move in coordination with translation of the glass tube 102 during the active time.

Referring again to FIGS. 1 and 2, methods for producing a plurality of glass articles from glass tube 102 may include securing the glass tube 102 in one of the holders 130 of the converter 100, where the converter 100 includes the plurality of processing stations 106. The processing stations 106 may include at least one heating station 202, at least one forming station 204, and a separating station 206. The methods may include rotating the glass tube 102 about the center axis D of the glass tube 102 and passing the glass tube 102 through each of the plurality of processing stations 106 to form one or more features at a working end of the glass tube 102. For any one or more of the plurality of processing stations 106, an active time of the processing station 106 may be an amount of time the glass tube 102 is maintained in engagement with a heating element 301 or forming tool 324 while in the processing station 106 and a revolutions per active time ratio is defined as a ratio of a number of revolutions of the glass tube 102 during the active time in each of the plurality of processing stations 106. An absolute difference between the revolutions per active time ratio and a nearest integer may be less than or equal to 0.30, less than or equal to 0.25, less than or equal to 0.20, or less than or equal to 0.10. Any of the methods disclosed herein may further comprise determining the revolutions per active time ratio by multiplying a rotational speed of the rotation of the glass tube 102 about center axis D in the glass tube holder 130 in units of rotations per time and the active time.

Any of the methods disclosed herein may include identifying an inhomogeneity in a temperature or dimension of the glass tube 102 around a circumference of the glass tube 102, determining the revolutions per active time ratio for the glass tube 102 in one or more processing stations 106, comparing the revolutions per active time ratio to the nearest integer, and adjusting a rotational speed of the glass tube 102, the active time, or both to maintain the absolute difference between the revolutions per active time ratio and the nearest integer less than or equal to 0.30, less than or equal to 0.25, less than or equal to 0.20, or less than or equal to 0.10. Any of the methods may include maintaining the revolutions per active time ratio within +/−0.30 of the nearest integer, within +/−0.25 of the nearest integer, within +/−0.20 of the nearest integer, within +/−0.15 of the nearest integer, or within +/−0.10 of the nearest integer, wherein maintaining the exposure index within +/−0.30, +/−0.25, +/−0.20, +/−0.15, or +/−0.10 of the nearest integer may reduce instability in rotation of the glass tube 102 and variations in temperature and/or dimensions circumferentially around the glass tube 102. In embodiments, the methods may include maintaining the revolutions per active time ratio equal to an integer.

Any of the methods disclosed herein may include maintaining the active time of each of the plurality of glass tubes 102 in each of the plurality of processing stations 106 constant. In embodiments, the active time for each of the processing stations 106 may be maintained constant by maintaining the dwell time constant. Any of the methods herein may include adjusting a rotational speed of each of the plurality of glass tubes 102 to maintain the absolute difference between the revolutions per active time ratio and the nearest integer less than or equal to 0.30, less than or equal to 0.25, less than or equal to 0.20, even less than or equal to 0.10, or even less than or equal to 0.05 for each of the plurality of glass tubes 102 in each of the plurality of processing stations 106 to reduce temperature and dimensional inhomogeneity in the glass tube 102 around a circumference of the glass tube 102. In embodiments, the methods may include maintaining the rotational speed of the glass tubes 102 constant and increasing or decreasing the active time of the glass tube 102 in the processing stations 106 to modify the revolutions per active time ratio. The active time of the glass tube 102 in the processing stations 106 may be increased or decreased by changing the amount of time the glass tube 102 is in the processing station 106 (e.g., changing the dwell time) or changing the timing of actuating or moving the heating elements 301 and/or forming tools 324 into or out of engagement with the glass tube 102 while in the processing station 106.

In embodiments, the converter 100 may include a plurality of holders 130 and the method may include securing a plurality of glass tubes 102 in the plurality of holders 130 and passing each of the plurality of holders 130 and the plurality of glass tubes 102 through the plurality of processing stations 106. In embodiments, each of the plurality of processing stations 106 may be in a fixed position and the converter 100 may index the glass tube 102 to each of the plurality of processing stations 106 sequentially. In embodiments, the converter 100 may be a continuous converter that may traverse the glass tube 102 continuously through the processing stations 106, and each of the plurality of processing stations 106 may move with the glass tube 102 during the active time.

Maintaining the exposure index in the processing stations 106 of the converter 100 proximate the nearest integer, such as within 0.30, 0.25, 0.20, 0.15, 0.10, or 0.05 of the nearest integer, may reduce wobble and reduce temperature and/or dimensional inhomogeneity around the circumference of the glass tube 102 during the converting process. This reduction in temperature and/or dimensional inhomogeneity around the circumference of the glass tube may reduce or prevent dimensional or cosmetic defects in the glass articles produced from the glass tube. Thus, the yields from the converting process may be increased by reducing yield loss and increasing production rate, among other features. It should be understood that various aspects of the systems and methods disclosed herein are described in the context of a converting process for producing pharmaceutical vials; however, it is understood that the systems and methods can be applied to converting processes for producing other articles, such as but not limited to cartridges, syringes, ampoules, etc.

Embodiments of the disclosure may be embodied in hardware and/or in software (including firmware, resident software, micro-code, etc.). The system controller 400 of the converter and/or other controllers on the converter 100 may include at least one processor and the computer-readable storage medium (i.e., memory module) as previously described in this specification. The system controller 400 may be communicatively coupled to one or more system components (e.g., converter 100, swivel burner actuator 332, forming tool actuator 326, translation system, measuring system, etc.) via any wired or wireless communication pathway. A computer-usable or the computer-readable storage medium or memory module may be any medium that can contain, store, communicate, propagate, or transport the program for use by or in connection with the instruction execution system, apparatus, or device.

The computer-usable or computer-readable storage medium or memory module may be, for example but not limited to, an electronic, magnetic, optical, electromagnetic, infrared, or semiconductor system, apparatus, device, or propagation medium. More specific examples (a non-exhaustive list) of the computer-readable storage medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer-readable storage medium may include machine readable and executable instructions for carrying out operations of the present disclosure. The machine readable and executable instructions may include computer program code that may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

EXAMPLES

The following examples illustrate the operation of the disclosed system and methods for producing a plurality of glass articles from glass tube in a converter. The following examples are not intended to be limit the scope of the present disclosure.

The following examples illustrate use of the disclosed systems and methods for reducing dimensional and cosmetic variations in articles made from glass tubing by reducing temperature and dimensional inhomogeneity around the circumference of the glass tube. The glass tubing in these Examples was aluminosilicate glass tubing, such as VALOR® glass manufactured and marketed by Corning Incorporated. The aluminosilicate glass tubing may be further processed by annealing and/or ion exchanging the glass tubing after converting. Although aluminosilicate glass is used in the examples, the effects of the systems and methods disclosed herein are not dependent on the type or composition of the glass.

Example 1—Effects of Exposure Index on Dimensional Homogeneity for the RP18

Figure 12:
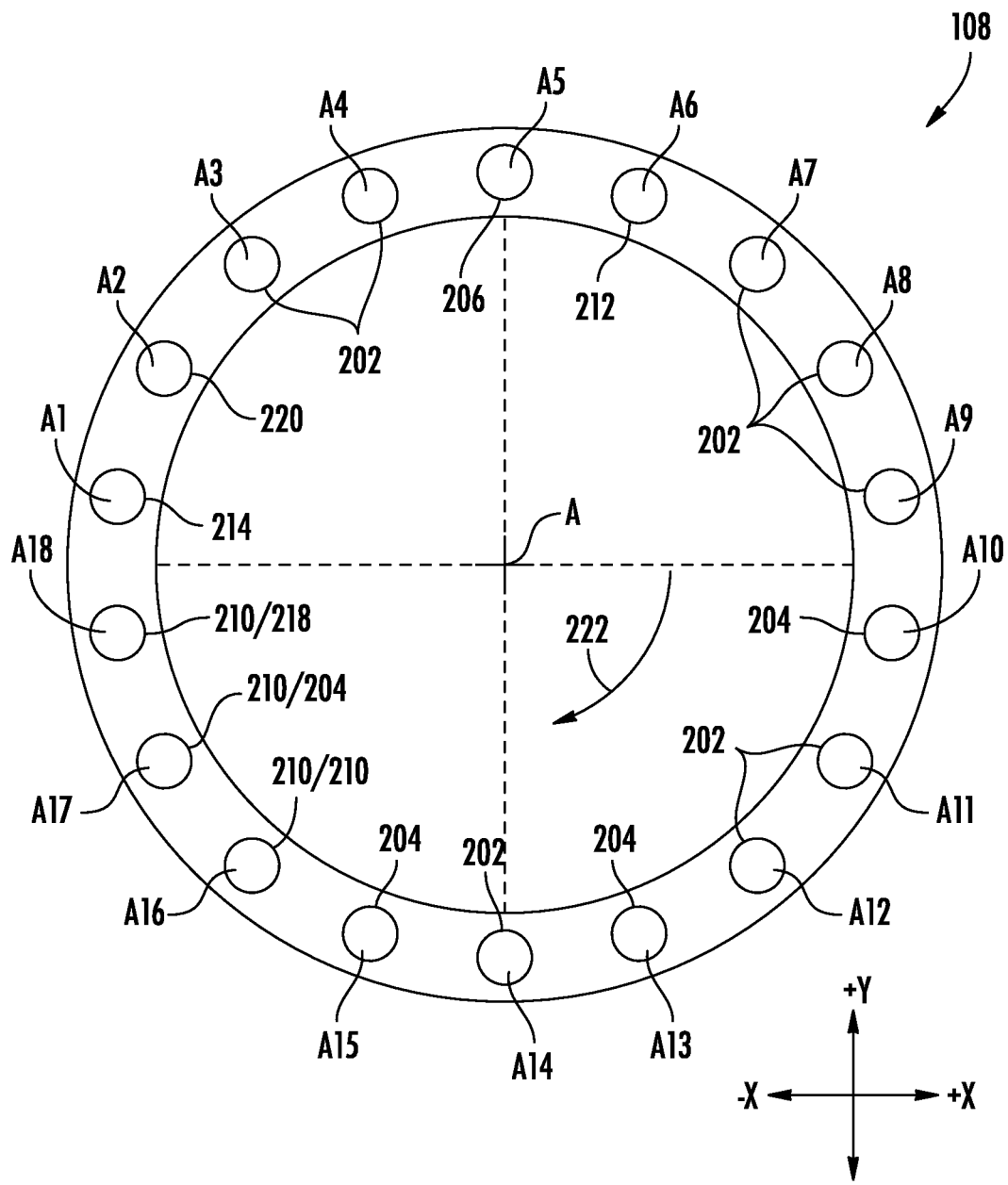
FIG. 12 schematically depicts a top view of a main turret having 18 processing stations, according to one or more embodiments shown and described herein.

In Example 1, experiments were performed on a converter for producing glass vials to demonstrate the effect of the exposure index on dimensional inhomogeneity around the circumference of the glass tube. For Example 1, glass tubes were converted into glass vials using a converter. The converter used was a Vial Forming Machine Model RP18 with Automatic Tube Feeder manufactured by AMBEG Dr. J. Dichter GmbH, which included eighteen processing stations in the main circuit. Descriptions of the processing stations of the main circuit of the converter used for Example 1 are provided in Table 1 hereinbelow. A main turret 108 having 18 processing stations allocated according to Table 1 is graphically depicted in FIG. 12.

TABLE 1

Description of the processing stations of the converter of Example 1

| Station No. | Description of Operation | Type of Station |
|---|---|---|
| A1 | Tube Loading and/or Cooling Station | Tube Loading/Cooling |
| A2 | Tube Drop to Determine the Vial Length | Tube Drop |
| A3 | Optional Separation Preheat | Heating |
| A4 | Separation Preheat | Heating |
| A5 | Separating | Separating |
| A6 | Flame Pierce of the Meniscus | Piercing |
| A7 | First Shoulder Preheat | Heating |
| A8 | Second Shoulder Preheat | Heating |
| A9 | Third Shoulder Preheat | Heating |
| A10 | Shoulder Forming | Forming |
| A11 | First Flange Preheat | Heating |
| A12 | Second Flange Preheat | Heating |
| A13 | Flange forming | Forming |
| A14 | Flange Finish Preheat | Heating |
| A15 | Flange Finishing | Forming |
| A16 | Cooling or Heating | Cooling/Heating |
| A17 | Cooling or Forming | Cooling/Forming |
| A18 | Cooling and/or Measurement | Cooling/Measuring |

For Example 1, the exposure index was adjusted by two independent parameters: the rotational speed of the glass tube in the holder and the part rate (in relation with dwell time). Whether the exposure index was modified with the rotation speed of the glass tube or the part rate, a consistent relation between the shape uniformity around the tube and the exposure index was found. For Example 1, the burner was fixed so that the active time for calculating the exposure time was equal to the dwell time of the converter. Each of the heating stations A7-A9 included a single flame burner. Thus, the exposure index for Example 1 was calculated as the rotational speed of the glass tube about the center axis multiplied by the dwell time. The rotational speeds of the glass tube in Table 2 are provided in rotations per minute (rpm) and rotations per second (rps). The following Table 2 also provides the part rate for the converter for each run condition. The index time is fixed. Thus, the change in part rate reflects a change in the dwell time. The dwell time used to calculate the exposure index in Table 2 is the dwell time corresponding to the part rate listed in Table 2.

TABLE 2

Exposure Index Data for Example 1

| Run No. | Rotational Speed of Glass Tube | | Part Rate | | Exposure Index |
|---|---|---|---|---|---|
| | rpm | rps | vials per minute | vials per second | |
| 1-1 | 332 | 5.53 | 44 | 0.73 | 6.00 |
| 1-2 | 346 | 5.77 | 44 | 0.73 | 6.25 |
| 1-3 | 360 | 6.00 | 44 | 0.73 | 6.50 |
| 1-4 | 374 | 6.23 | 44 | 0.73 | 6.75 |
| 1-5 | 388 | 6.47 | 44 | 0.73 | 7.01 |
| 1-6 | 360 | 6.00 | 47 | 0.78 | 5.98 |
| 1-7 | 360 | 6.00 | 45.5 | 0.76 | 6.23 |
| 1-8 | 360 | 6.00 | 44 | 0.73 | 6.50 |
| 1-9 | 360 | 6.00 | 42.5 | 0.71 | 6.79 |
| 1-10 | 360 | 6.00 | 41.5 | 0.69 | 6.99 |

Figure 10:
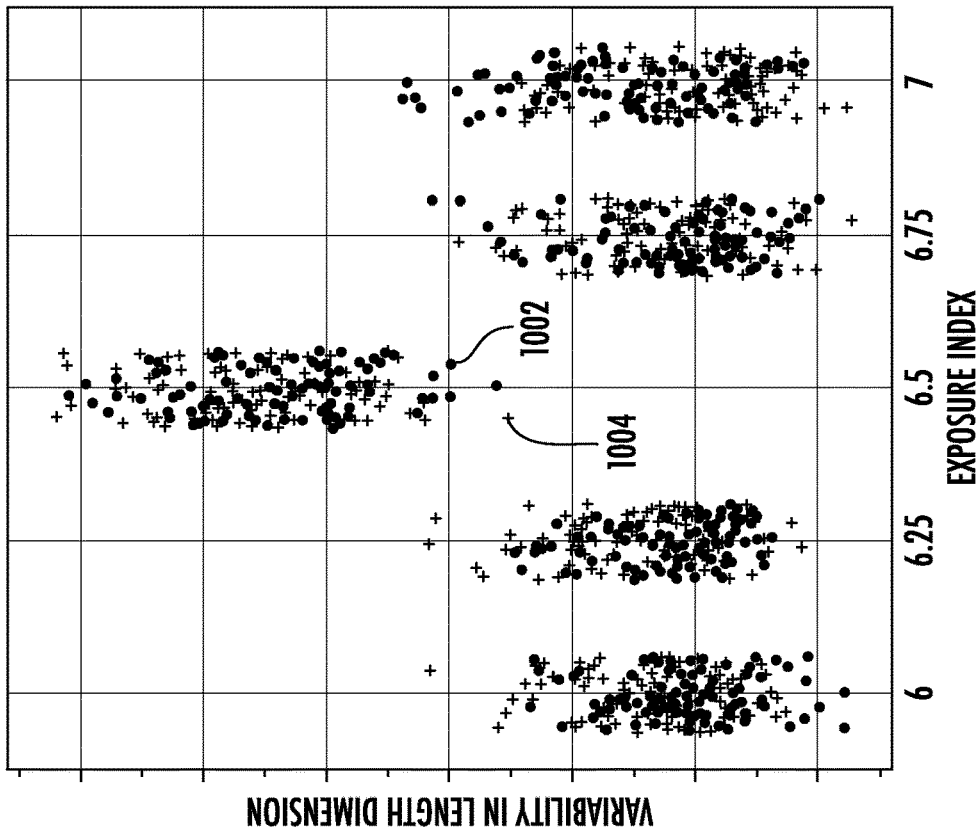
FIG. 10 graphically depicts a relative length dimension (y-axis) of a glass tube processed in the heating station of FIG. 6A as a function of an exposure index (x-axis) of the glass tube at constant dwell time, according to one or more embodiments shown and described herein.

For each set of run conditions, a length dimension of the glass tube was measured in the +/−Z direction for points around the circumference of the glass tube at the end of the dwell time for processing stations A9 and A10 for a plurality of glass tubes. The variability in the length dimension with respect to the circumference of the glass tube was determined by taking the difference between the maximum dimension and minimum dimension. The results for Example 1 are graphically depicted in FIG. 10. In FIG. 10, reference number 1002 (solid circles) represents the data for run numbers 1-1 through 1-5, for which the rotational speed of the glass tube was modified and the part rate was maintained constant, and reference number 1004 (plus signs) represents the data for run numbers 1-6 through 1-10, for which the part rate was varied and the rotational speed was held constant. As shown by FIG. 10, whether the part rate or rotational speed was varied made no difference in the effects of the exposure index on the variability in the length dimension.

Increased variability in the vertical length dimension of the glass tube provides an indication of wobble, resulting in dimensional and cosmetic inhomogeneity in the finished glass articles. As shown in FIG. 10, the variability in the vertical length dimension, and thus the wobble of the glass tube, is more pronounced at an exposure index of 6.5 compared to the exposure indices of 6.0 and 7.0 when measured at the end of the dwell time for both the A9 and A10 processing stations. These observations demonstrate that when a difference between the exposure index and the nearest integer is greater than about 0.30 or about 0.25, greater circumferential thermal gradients result, which in turn can cause instability in the rotating glass preform and temperature and dimensional inhomogeneity in the glass tube during heating and forming. The general trend in the variability of the dimensions of the glass tube 102 (for either A9 or A10 end of dwell) as a function of the exposure index—with greater instability at the 6.5 revolution conditions than the 6.0 or 7.0—is observed regardless of whether the exposure index is changed via changes to the part rate or changes to the chuck speed (i.e., rotations speed of the glass tube 102 in the holder 130). This result strongly suggests the average number of revolutions of the glass tube during the active time in the processing station is responsible for the instability, since the wobble is shown to be present by changing two different process variables.

Example 2—Effects of Exposure Index on Dimensional Homogeneity for the RP18

In Example 2, experiments were performed on a converter for producing glass vials to demonstrate the effect of the exposure index on dimensional inhomogeneity around the circumference of the glass tube. For Example 2, glass tubes were converted into glass vials using a converter. The converter used was a Vial Forming Machine Model RP16 with Automatic Tube Feeder manufactured by AMBEG Dr. J. Dichter GmbH, which included sixteen processing stations in the main circuit. Descriptions of the processing stations of the main circuit of the converter used for Example 2 are provided in Table 3 hereinbelow.

TABLE 3

Description of the processing stations of the converter of Example 1

| Station No. | Description of Operation | Type of Station |
| --- | --- | --- |
| A1 | Tube Loading and/or Cooling Station | Tube Loading/Cooling |
| A2 | Cool an Existing Tube or Preheat a Newly Loaded Length of Glass Tube | Cooling/Heating |
| A3 | Optional Separation Preheat | Heating |
| A4 | Separation Preheat | Heating |
| A5 | Separating | Separating |
| A6 | Flame Pierce of the Meniscus | Piercing |
| A7 | First Shoulder Preheat | Heating |
| A8 | Second Shoulder Preheat | Heating |
| A9 | Third Shoulder Preheat | Heating |
| A10 | Shoulder Forming | Forming |
| A11 | Flange Preheating | Heating |
| A12 | Flange Forming | Forming |
| A13 | Flange Finish Preheating | Heating |
| A14 | Flange Finishing | Forming |
| A15 | Cooling | Cooling |
| A16 | Tube Drop to Determine the Vial Length | Tube Drop |

For Example 2, the exposure index was adjusted by two independent parameters: the rotational speed of the glass tube in the holder and the part rate (in relation with dwell time). Whether the exposure index was modified with the rotation speed of the glass tube or the part rate, a consistent relation between the shape uniformity around the tube and the exposure index was found. For Example 1, the active time for calculating the exposure time was equal to the dwell time of the converter. Each of the heating stations A7-A9, A11, and A13 included a single flame burner. Thus, the exposure index for Example 2 was calculated as the rotational speed of the glass tube about the center axis multiplied by the dwell time. The rotational speeds of the glass tube in Table 4 are provided in rotations per minute (rpm) and rotations per second (rps). The following Table 4 also provides the part rate for the converter for each run condition. The index time is fixed. Thus, the change in part rate reflects a change in the dwell time. The dwell time used to calculate the exposure index in Table 4 is the dwell time corresponding to the part rate listed in Table 4.

TABLE 4

Exposure Index Data for Example 2

| | Rotational Speed of Glass Tube | | Part Rate | | |
| --- | --- | --- | --- | --- | --- |
| Run No. | rpm | rps | vials per minute | vials per second | Exposure Index |
| 2-1 | 309 | 5.15 | 29 | 0.48 | 7.99 |
| 2-2 | 319 | 5.32 | 29 | 0.48 | 8.25 |
| 2-3 | 329 | 5.48 | 29 | 0.48 | 8.51 |
| 2-4 | 338 | 5.63 | 29 | 0.48 | 8.74 |
| 2-5 | 348 | 5.80 | 29 | 0.48 | 9.00 |
| 2-6 | 327 | 5.45 | 31 | 0.52 | 7.91 |
| 2-7 | 327 | 5.45 | 30 | 0.50 | 8.18 |
| 2-8 | 327 | 5.45 | 29 | 0.48 | 8.46 |
| 2-9 | 327 | 5.45 | 28 | 0.47 | 8.76 |
| 2-10 | 327 | 5.45 | 27 | 0.45 | 9.08 |

Figure 11:
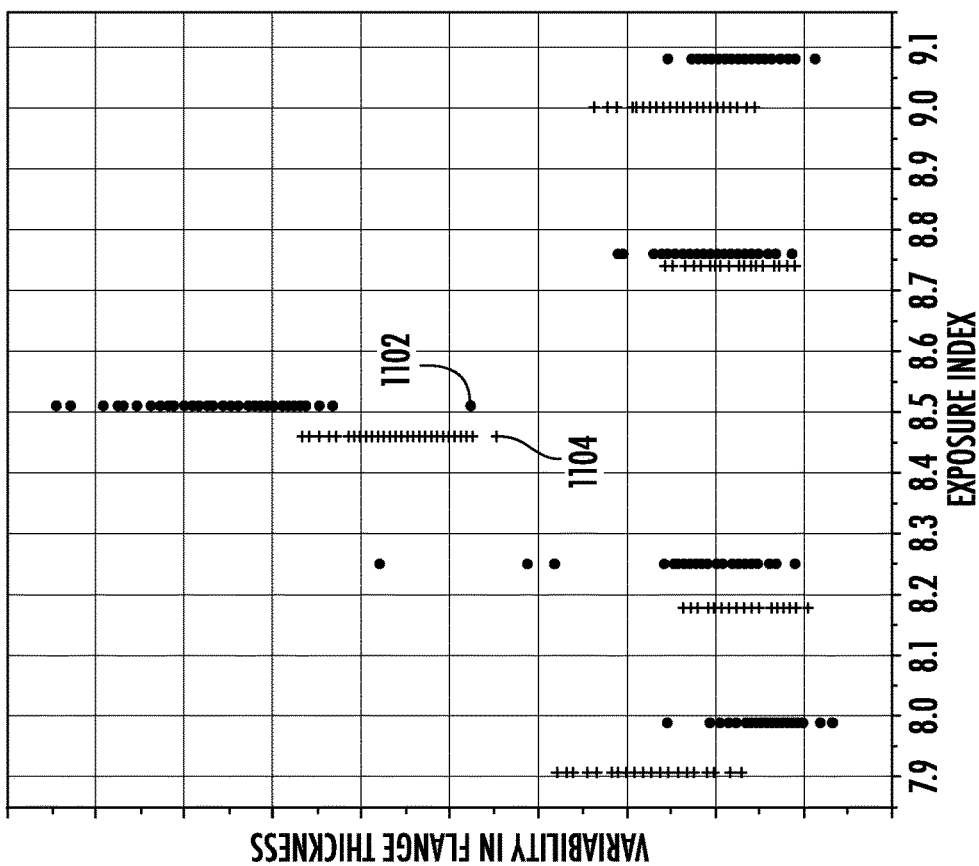
FIG. 11 graphically depicts a relative flange thickness (y-axis) of a glass vial made from a glass tube processed in the heating station of FIG. 6A as a function of an exposure index (x-axis) of the glass tube at constant dwell time, according to one or more embodiments shown and described herein.

For each set of run conditions of Example 2, the thickness of the flange of the vial was measured for points around the circumference of the glass tube at the end of the dwell time for processing station A10 for a plurality of glass tubes. The variability in the flange thickness with respect to the circumference of the glass tube was determined by taking the difference between the maximum thickness and minimum thickness. The results for Example 2 are graphically depicted in FIG. 11. In FIG. 11, reference number 1102 (solid circles) represents the data for run numbers 2-1 through 2-5, for which the rotational speed of the glass tube was modified and the part rate was maintained constant, and reference number 1104 (plus signs) represents the data for run numbers 2-6 through 2-10, for which the part rate was varied and the rotational speed was held constant. As shown by FIG. 11, whether the part rate or rotational speed was varied made no difference in the effects of the exposure index on the variability in the length dimension.

Again, with the RP16 converter, the exposure index of the glass tube in the processing stations was observed to have a strong influence on the dimensional homogeneity around the circumference of the glass tube. In particular, in Example 2, changing the exposure index demonstrated that at the variations in the flange thickness are reduced when the exposure index is near an integer value (8 or 9 in Example 2) and substantially greater when the exposure index is greater than 0.25 or 0.3 from the nearest integer (e.g., exposure index equal to about 8.5 for runs 2-3 and 2-8).

As shown in FIG. 11, the variability in the flange thickness is more pronounced at an exposure index of 8.5 compared to the exposure indices in the ranges of from 8.0 to 8.3 and from 8.7 to 9.0 (both ranges within 0.3 of an integer) when measured at the end of the dwell time for the A9 processing station. These observations demonstrate that when a difference between the exposure index and the nearest integer is greater than about 0.30 or about 0.25, greater circumferential thermal gradients result, which in turn can cause instability in the rotating glass preform and temperature and dimensional inhomogeneity in the glass tube during heating and forming. Thus, dimensional inhomogeneity of features of the glass articles made from the glass tube can be reduced by adjusting the operating parameters so that the exposure index of the glass tube is within 0.30 or within 0.25 of the nearest integer. The general trend in the variability of the flange thickness of the glass tube 102 was observed regardless of whether the exposure index is changed via changes to the part rate or changes to the chuck speed (i.e., rotations speed of the glass tube 102 in the holder 130).

While various embodiments of the converter 100 and system and methods for producing a plurality of articles from glass tubes 102 have been described herein, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for producing a plurality of glass articles from glass tube, the method comprising:
   securing a glass tube in a holder of a converter comprising a plurality of processing stations, the processing stations comprising at least one heating station and at least one forming station;
   rotating the glass tube about a center axis of the glass tube in the holder;
   passing the glass tube through each of the plurality of processing stations to form one or more features at a working end of the glass tube, wherein, for any one of the plurality of processing stations:
      an active time of the processing station is an amount of time the glass tube is maintained in engagement with at least one heating element or at least one forming tool while in the processing station;
      an exposure index for the processing station is equal to a rotational speed of the glass tube within the holder multiplied by a number of heating elements or a number of forming tools in the processing station and multiplied by the active time of the glass tube in the processing station; and
      an absolute difference between the exposure index and a nearest integer is less than or equal to 0.30; and
   controlling the converter with a system controller communicatively coupled to the converter, the system controller comprising at least one processor and at least one non-transitory storage medium containing computer readable and executable instructions which, when executed by the processor, cause the system controller to automatically perform the following steps:
      identifying one or more temperature or dimensional inhomogeneity in the glass tube around a circumference of the glass tube;
      determining the exposure index of the glass tube for one or more of the plurality of processing stations;
      comparing the exposure index for each of the one or more processing stations to the nearest integer; and
      adjusting the rotational speed of the glass tube, the active time of the glass tube in the processing stations, or both to maintain the absolute difference between the exposure index and the nearest integer less than or equal to 0.30.

2. The method of claim 1, comprising maintaining the exposure index within +/−0.30 of the nearest integer, wherein maintaining the exposure index within +/−0.30 of the nearest integer reduces instability in rotation of the glass tube and variations in temperature circumferentially around the glass tube.

3. The method of claim 1, comprising maintaining the active time constant for each of the plurality of glass tubes in each of the plurality of processing stations and adjusting a rotational speed of each of the plurality of glass tubes to maintain the absolute difference between the exposure index and the nearest integer less than or equal to 0.30 for each of the plurality of glass tubes in each of the plurality of processing stations to reduce temperature and dimensional inhomogeneity in the glass tube around a circumference of the glass tube.

4. The method of claim 1, comprising changing an active time for each of the plurality of glass tubes in one or more of the plurality of processing stations to maintain the absolute difference between the exposure index and the nearest integer less than or equal to 0.30 for each of the plurality of glass tubes in each of the plurality of processing stations to reduce temperature and dimensional inhomogeneity in the glass tube around a circumference of the glass tube.

5. A system for producing a plurality of glass articles from glass tube, the system comprising:
   a converter having a plurality of processing stations comprising at least one heating station, at least one forming station, and a separating station;
   a plurality of holders, each of the plurality of holders operable to secure a glass tube and rotate the glass tube about a center axis of the glass tube; and
   a system controller communicatively coupled to the converter;

wherein the converter is operable to move the plurality of holders and glass tubes through the plurality of processing stations;

wherein each of the plurality of processing stations has an exposure index defined as a rotational speed of the glass tube within the holder in units of rotations per time multiplied by a number of heating elements or a number of forming tools contacting an outer surface of the glass tube in the processing station and multiplied by the active time of the glass tube in the processing station;

wherein an absolute difference between the exposure index and a nearest integer is less than or equal to 0.30 for each of the plurality of processing stations; and wherein the system controller comprising at least one processor and at least one non-transitory storage medium containing computer readable and executable instructions which, when executed by the processor, cause the system controller to automatically:

identify one or more temperature or dimensional inhomogeneity in the glass tube around a circumference of the glass tube;

determine an exposure index of the glass tube for one or more of the plurality of processing stations;

compare the exposure index for each of the one or more processing stations to a nearest integer; and adjust a rotational speed of the glass tube, an active time of the glass tube in the processing stations, or both to maintain an absolute difference between the exposure index and the nearest integer less than or equal to 0.30.

6. The system of claim 5, wherein the at least one heating station of the converter comprises at least one swivel burner operatively coupled to a swivel burner actuator operable to pivot the swivel burner into and out of engagement with the glass tube in the at least one heating station to change the active time of the glass tube in the at least one heating station.

7. The system of claim 5, wherein the at least one heating station of the converter comprises a burner translation system operable to translate at least one burner horizontally or vertically into and out of engagement with the glass tube to change the active time of the glass tube in the at least one heating station.

8. The system of claim 5, wherein the at least one forming station of the converter comprises at least one forming tool operatively coupled to a forming tool actuator operable to translate the forming tool into and out of engagement with the glass tube to change the active time of the glass tube in the at least one forming station.

9. The system of claim 5, wherein the converter comprises a measuring system operable to determine at least a temperature of the glass tube, at least a dimension of the glass tube, or combinations of these around a circumference of the glass tube.

10. The system of claim 5, wherein the computer readable and executable instructions, when executed by the processor, cause the system to adjust the rotational speed of the glass tube to adjust the exposure index for one or a plurality of the processing stations.

11. The system of claim 5, wherein the computer readable and executable instructions, when executed by the processor, cause the system to adjust the active time in one or more processing stations to adjust the exposure index.

12. The system of claim 5, wherein the computer readable and executable instructions, when executed by the processor, cause the system to automatically adjust the active time of the at least one heating station by modifying the timing of moving the heating elements into and out of engagement with the glass tube.

13. The system of claim 5, wherein the at least one heating station comprises a swivel burner operatively coupled to a swivel burner actuator, wherein the swivel burner actuator is communicatively coupled to the system controller and operable to receive control signals from the system controller and pivot the swivel burner into and out of engagement with the glass tube, and the computer readable and executable instructions, when executed by the processor, cause the system to automatically change the timing of pivoting the swivel burner into and out of engagement with the glass tube to change the active time of the glass tube in the heating station.

14. The system of claim 5, wherein the at least one forming station comprises at least one forming tool operatively coupled to a forming tool actuator, where the forming tool actuator is communicatively coupled to the system controller and is operable to receive one or more control signals from the system controller and translate the forming tool into and out of engagement with the glass tube.

15. The system of claim 14, wherein the computer readable and executable instructions, when executed by the processor, cause the system to automatically change the timing of translating the forming tools into and out of engagement with the glass tube to change the active time of the glass tube in the forming station.

16. The system of claim 5, wherein the converter comprises a measuring system disposed proximate the at least one heating station, the at least one forming station, or both, wherein the measuring system is communicatively coupled to the system controller and is operable to measure at least one property of the glass tube around a circumference of the glass tube and transmit a signal to the system controller indicative of the property to the system controller.

17. The system of claim 16, wherein the at least one property of the glass tube comprises at least one temperature, at least one dimension, or both around the circumference of the glass tube.

18. The system of claim 16, wherein the computer readable and executable instructions, when executed by the processor, cause the system to automatically receive a signal from the measuring system indicative of the one or more properties of the glass tube, determine a variability of the property of the glass tube around a circumference of the glass tube, and adjust the active time, the rotational speed of the glass tube about the center axis, or both in the processing station to modify the exposure index in response to the variability of the property of the glass tube.

* * * * *